US012677332B2

(12) United States Patent
Esswie

(10) Patent No.: US 12,677,332 B2
(45) Date of Patent: Jul. 7, 2026

(54) ENERGY-EFFICIENT BEAM-GROUP RANDOM ACCESS

(71) Applicant: Dell Products L.P., Round Rock, TX (US)

(72) Inventor: Ali Esswie, Calgary (CA)

(73) Assignee: Dell Products L.P., Round Rock, TX (US)

( * ) Notice: Subject to any disclaimer, the term of this patent is extended or adjusted under 35 U.S.C. 154(b) by 306 days.

(21) Appl. No.: 18/599,956

(22) Filed: Mar. 8, 2024

(65) Prior Publication Data

US 2025/0287436 A1      Sep. 11, 2025

(51) Int. Cl.
| | |
|---|---|
| *H04W 76/10* | (2018.01) |
| *H04B 7/06* | (2006.01) |
| *H04W 8/22* | (2009.01) |
| *H04W 16/28* | (2009.01) |
| *H04W 76/28* | (2018.01) |

(52) U.S. Cl.
CPC ........ *H04W 76/10* (2018.02); *H04B 7/06952* (2023.05); *H04W 8/22* (2013.01); *H04W 16/28* (2013.01); *H04W 76/28* (2018.02)

(58) Field of Classification Search
CPC ..... H04W 76/10; H04W 76/28; H04W 76/27; H04W 76/30; H04W 8/22; H04B 7/06952
USPC .................................................. 370/329–330
See application file for complete search history.

(56) References Cited

U.S. PATENT DOCUMENTS

| | | | |
|---|---|---|---|
| 2019/0223058 A1* | 7/2019 | Fukui | H04W 36/0016 |
| 2020/0022040 A1* | 1/2020 | Chen | H04W 72/046 |
| 2020/0404617 A1* | 12/2020 | Murray | H04W 52/0229 |
| 2021/0144516 A1* | 5/2021 | Kim | H04W 72/046 |
| 2021/0258963 A1* | 8/2021 | Sakhnini | H04W 76/27 |
| 2022/0078735 A1* | 3/2022 | Saggar | H04L 27/261 |
| 2022/0123819 A1* | 4/2022 | Taherzadeh Boroujeni | H04B 7/0408 |
| 2024/0206006 A1* | 6/2024 | Elshafie | H04W 52/0229 |
| 2024/0340795 A1* | 10/2024 | Kim | H04L 1/1887 |

* cited by examiner

*Primary Examiner* — Candal Elpenord
(74) *Attorney, Agent, or Firm* — Amin, Turocy & Watson, LLP

(57) ABSTRACT

A radio network node may configure a user equipment with reduced-capability connection information usable to facilitate establishing a connection with the node during a discontinuous receive off period. From the reduced-capability connection information, the user equipment may determine a beam group. During discontinuous receive off operation at the node, the user equipment may transmit an emergency preamble according to the beam group, which may be associated with group random access resources, including a composite beam direction, monitored by the node. During discontinuous receive off operation, the node may avoid monitoring resources associated with individual beams corresponding to a beam group. The node may determine a number of user equipment transitioning to a connected mode with respect to a beam and determine the beam to be an important beam if a number of transitioning user equipment satisfies a transitioning criterion. A beam group may solely comprise an important beam.

20 Claims, 18 Drawing Sheets

A method, comprising facilitating, by a radio network node comprising at least one processor, receiving, from network equipment, a reduced-capability connection establishment criterion configuration, comprising at least one mode transitioning criterion 1105 with respect to at least one first beam corresponding to the radio network node, determining, by the radio network node, a first number of user equipment transitioning to a connected mode with respect to the radio network node to result in a determined first transitioning number 1110 analyzing, by the radio network node, the determined first transitioning number with respect to the at least one mode transitioning criterion to result in an analyzed determined first transitioning number 1115 based on the analyzed determined first transitioning number failing to satisfy the at least one mode transitioning criterion, determining, by the radio network node, reduced-capability connection establishment information to be associated with, during a discontinuous receive off period to be enabled at least in part by the radio network node, a beam group that comprises the at least one first beam and a second beam 1120 broadcasting, by the radio network node, a reduced-capability connection establishment information indication indicative of the reduced-capability connection establishment information usable, by at least one idle user equipment, to facilitate transmission of uplink traffic to the radio network node during the discontinuous receive off period 1125

1100

200

| |
| --- |
| Reduced-capability random access configurations over backhaul links |
| Minimum threshold of number of user equipment transitioning from idle-to-active mode per downlink beam usable to determine allocation of dedicated RACH channel resources during RAN DRX OFF periods |
| Rolling time window duration during which number of active user equipment per downlink beam is tracked |

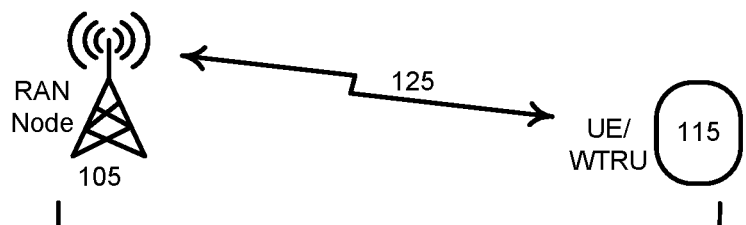

RAN Node 105

125

UE/ WTRU 115

RAN node receives reduced-capability connection establishment criterion configuration from core network via backhaul interface link(s), including: a minimum threshold of number of idle-to-active/connected transitioning user equipment devices per downlink beam to determine allocation of dedicated RACH channel resources such beam during RAN DRX off periods; or a rolling/sliding time period during which the number of transitioning user equipment devices per downlink beam is tracked

805

RAN node transmits reduced-capability connection establishment information configuration to UE via downlink radio interface link(s) comprising: RAN DRX off activation timing information; timing and frequency resource information corresponding to at least one uplink emergency random access channel and associated at least downlink beam group indication comprising one or more downlink beams to which emergency RACH channel resource(s) is/are assigned; at least one traffic and/or service and/or quality-of-service priority level usable to determine to trigger emergency radio access during RAN DRX off periods; or indication of emergency random access preamble for urgent radio access during RAN DRX off periods

810

On condition of determining a number of idle-to-active/connected transitioning user equipment devices, which have been camping on a certain downlink beam, that is larger than the configured minimum threshold, RAN node updates currently-active RACH resource groups to allocate a dedicated RACH resource group to an important beam corresponding to the number of transitioning user equipment, or allocates a dedicated RACH resource set for each one or more consecutive downlink beams, except from the determined downlink beam, that are not an important beam

815

RAN node transmitting and broadcasting updated reduced-capability random access information that comprises at least one updated RACH resource group indication and at least one associated downlink beam indication corresponding to at least one beam of a beam group to which resources corresponding to the RACH resource indication are allocated

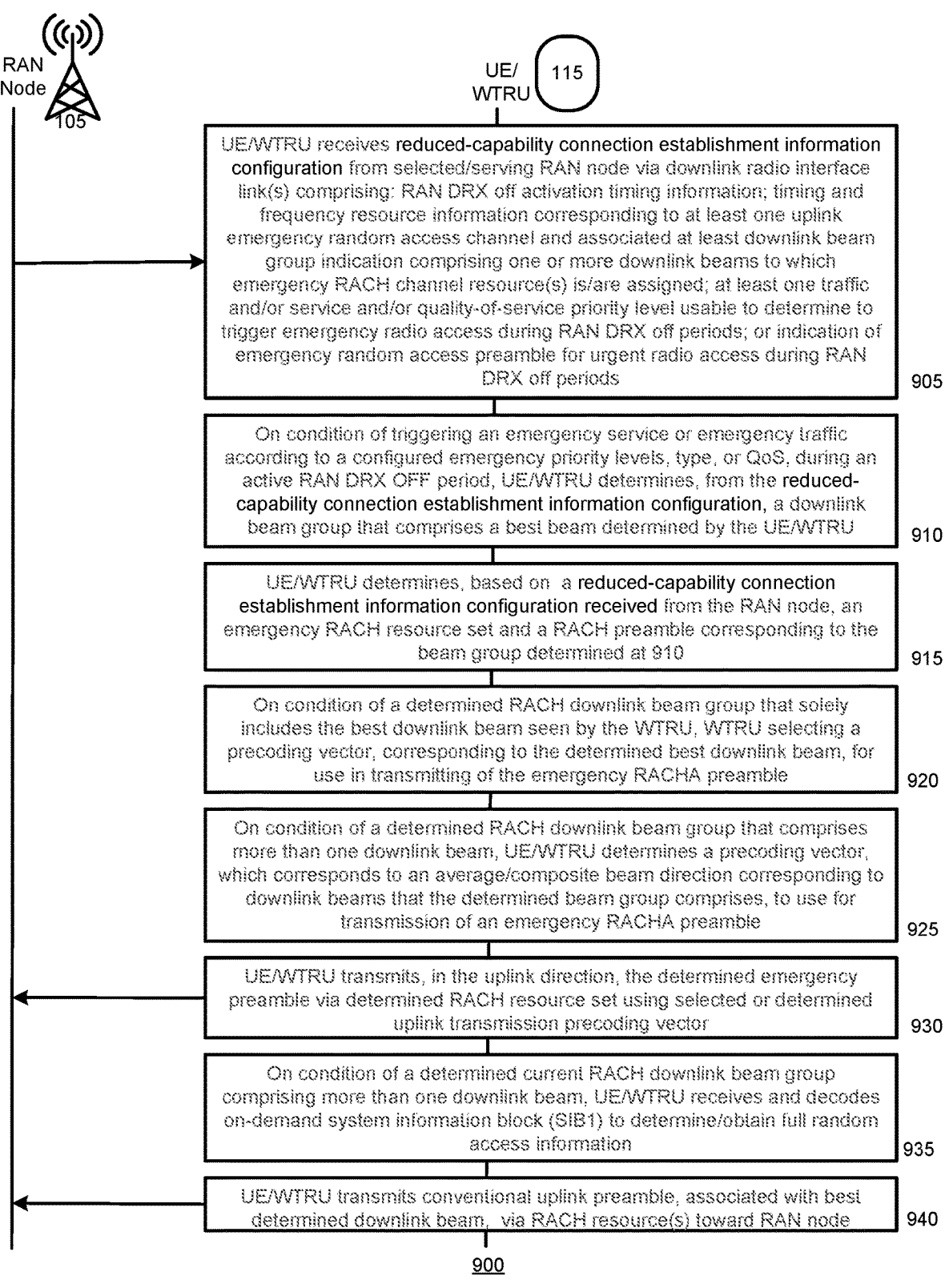

RAN
Node

UE/
WTRU   115

105

UE/WTRU receives reduced-capability connection establishment information configuration from selected/serving RAN node via downlink radio interface link(s) comprising: RAN DRX off activation timing information; timing and frequency resource information corresponding to at least one uplink emergency random access channel and associated at least downlink beam group indication comprising one or more downlink beams to which emergency RACH channel resource(s) is/are assigned; at least one traffic and/or service and/or quality-of-service priority level usable to determine to trigger emergency radio access during RAN DRX off periods; or indication of emergency random access preamble for urgent radio access during RAN DRX off periods    905

On condition of triggering an emergency service or emergency traffic according to a configured emergency priority levels, type, or QoS, during an active RAN DRX OFF period, UE/WTRU determines, from the reduced-capability connection establishment information configuration, a downlink beam group that comprises a best beam determined by the UE/WTRU    910

UE/WTRU determines, based on a reduced-capability connection establishment information configuration received from the RAN node, an emergency RACH resource set and a RACH preamble corresponding to the beam group determined at 910    915

On condition of a determined RACH downlink beam group that solely includes the best downlink beam seen by the WTRU, WTRU selecting a precoding vector, corresponding to the determined best downlink beam, for use in transmitting of the emergency RACHA preamble    920

On condition of a determined RACH downlink beam group that comprises more than one downlink beam, UE/WTRU determines a precoding vector, which corresponds to an average/composite beam direction corresponding to downlink beams that the determined beam group comprises, to use for transmission of an emergency RACHA preamble    925

UE/WTRU transmits, in the uplink direction, the determined emergency preamble via determined RACH resource set using selected or determined uplink transmission precoding vector    930

On condition of a determined current RACH downlink beam group comprising more than one downlink beam, UE/WTRU receives and decodes on-demand system information block (SIB1) to determine/obtain full random access information    935

UE/WTRU transmits conventional uplink preamble, associated with best determined downlink beam, via RACH resource(s) toward RAN node    940

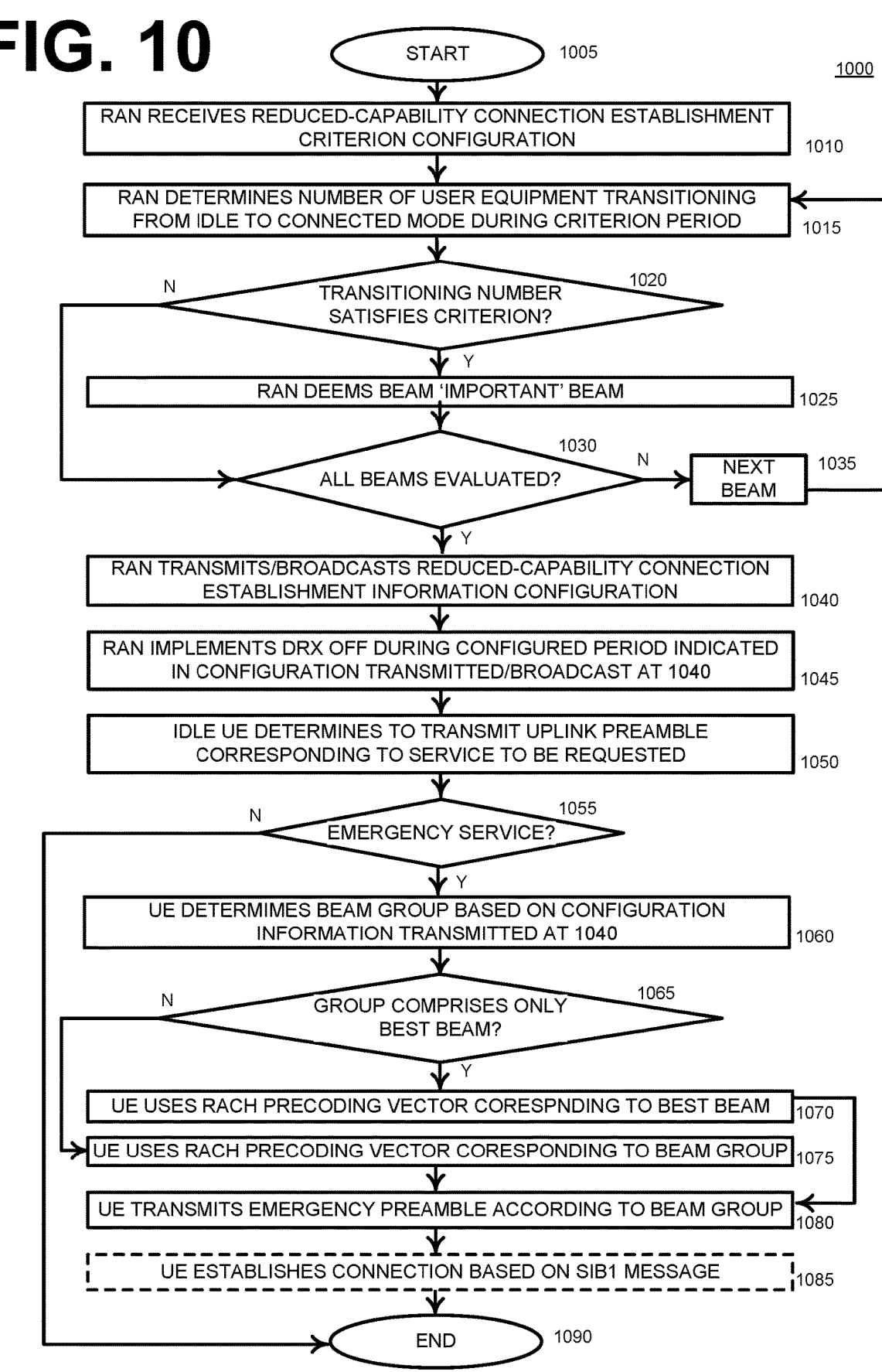

START 1005

1000

RAN RECEIVES REDUCED-CAPABILITY CONNECTION ESTABLISHMENT CRITERION CONFIGURATION

1010

RAN DETERMINES NUMBER OF USER EQUIPMENT TRANSITIONING FROM IDLE TO CONNECTED MODE DURING CRITERION PERIOD

1015

N    TRANSITIONING NUMBER SATISFIES CRITERION?

1020

Y

RAN DEEMS BEAM 'IMPORTANT' BEAM

1025

ALL BEAMS EVALUATED?

1030

N   NEXT BEAM

1035

Y

RAN TRANSMITS/BROADCASTS REDUCED-CAPABILITY CONNECTION ESTABLISHMENT INFORMATION CONFIGURATION

1040

RAN IMPLEMENTS DRX OFF DURING CONFIGURED PERIOD INDICATED IN CONFIGURATION TRANSMITTED/BROADCAST AT 1040

1045

IDLE UE DETERMINES TO TRANSMIT UPLINK PREAMBLE CORRESPONDING TO SERVICE TO BE REQUESTED

1050

N    EMERGENCY SERVICE?

1055

Y

UE DETERMIMES BEAM GROUP BASED ON CONFIGURATION INFORMATION TRANSMITTED AT 1040

1060

N    GROUP COMPRISES ONLY BEST BEAM?

1065

Y

UE USES RACH PRECODING VECTOR CORESPNDING TO BEST BEAM

1070

UE USES RACH PRECODING VECTOR CORESPONDING TO BEAM GROUP

1075

UE TRANSMITS EMERGENCY PREAMBLE ACCORDING TO BEAM GROUP

1080

UE ESTABLISHES CONNECTION BASED ON SIB1 MESSAGE

1085

END 1090

Figure 11:
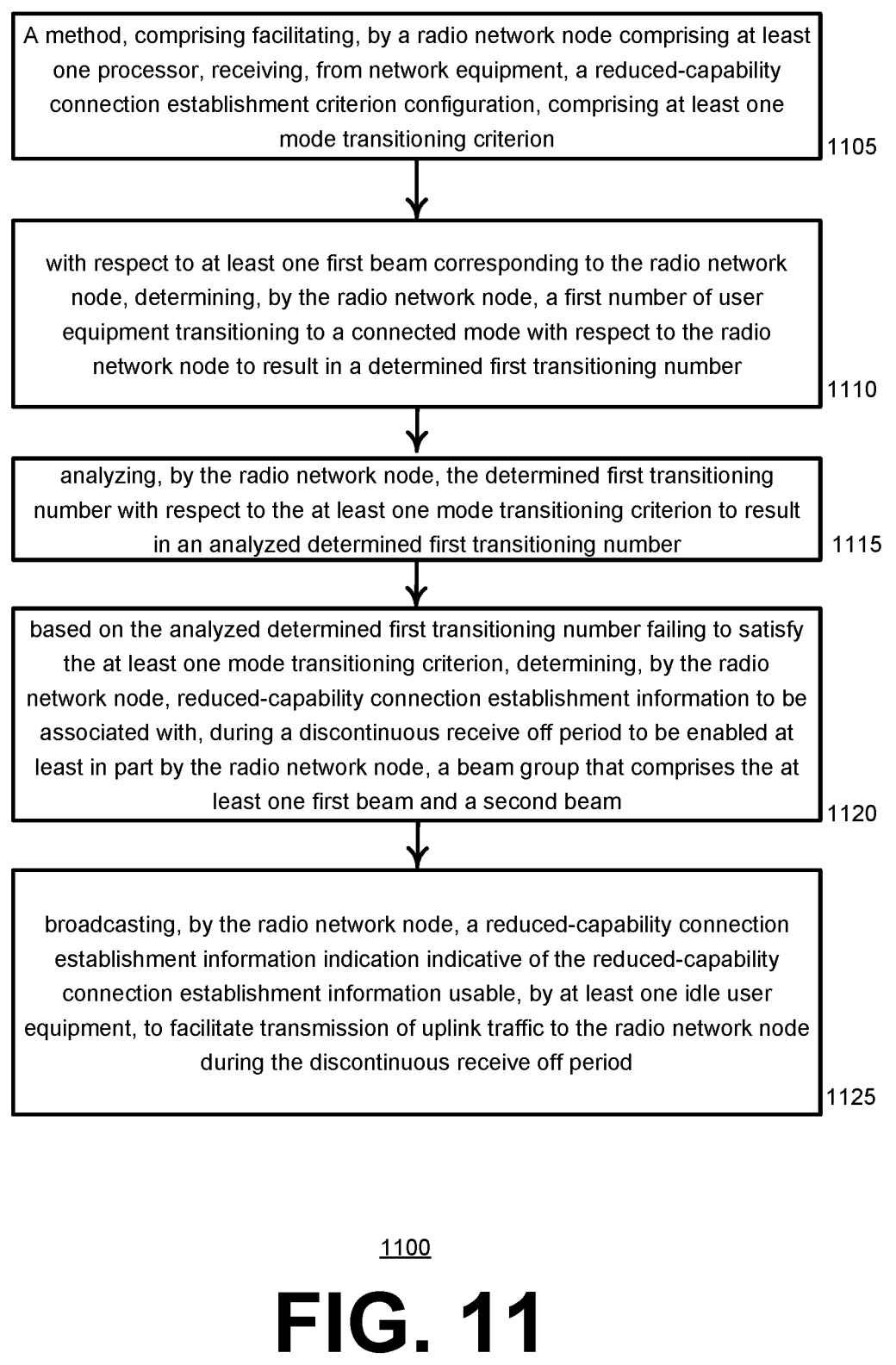

A method, comprising facilitating, by a radio network node comprising at least one processor, receiving, from network equipment, a reduced-capability connection establishment criterion configuration, comprising at least one mode transitioning criterion
1105

↓ with respect to at least one first beam corresponding to the radio network node, determining, by the radio network node, a first number of user equipment transitioning to a connected mode with respect to the radio network node to result in a determined first transitioning number
1110

↓ analyzing, by the radio network node, the determined first transitioning number with respect to the at least one mode transitioning criterion to result in an analyzed determined first transitioning number
1115

↓ based on the analyzed determined first transitioning number failing to satisfy the at least one mode transitioning criterion, determining, by the radio network node, reduced-capability connection establishment information to be associated with, during a discontinuous receive off period to be enabled at least in part by the radio network node, a beam group that comprises the at least one first beam and a second beam
1120

↓ broadcasting, by the radio network node, a reduced-capability connection establishment information indication indicative of the reduced-capability connection establishment information usable, by at least one idle user equipment, to facilitate transmission of uplink traffic to the radio network node during the discontinuous receive off period
1125

Figure 12:
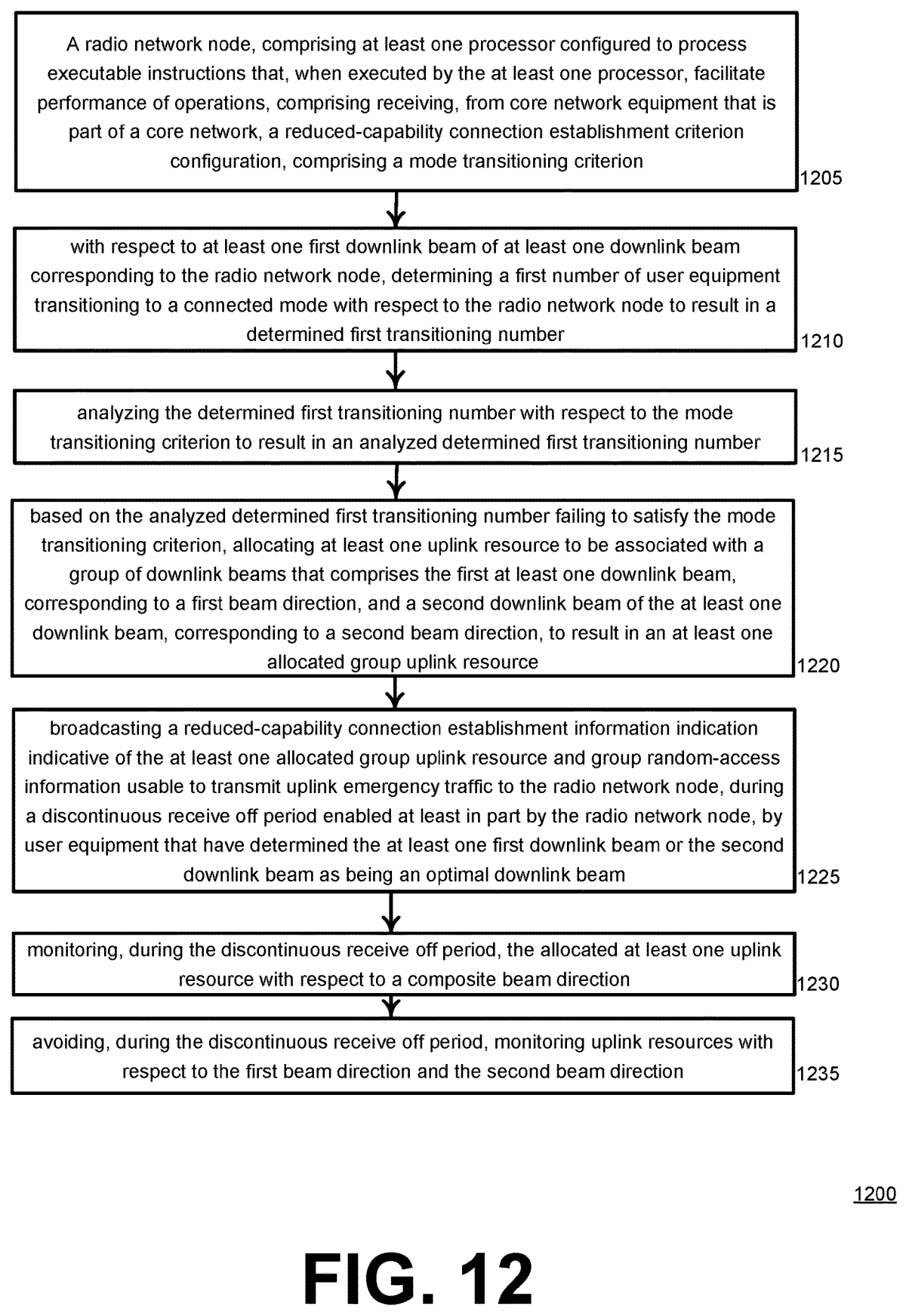

A radio network node, comprising at least one processor configured to process executable instructions that, when executed by the at least one processor, facilitate performance of operations, comprising receiving, from core network equipment that is part of a core network, a reduced-capability connection establishment criterion configuration, comprising a mode transitioning criterion

1205 with respect to at least one first downlink beam of at least one downlink beam corresponding to the radio network node, determining a first number of user equipment transitioning to a connected mode with respect to the radio network node to result in a determined first transitioning number

1210 analyzing the determined first transitioning number with respect to the mode transitioning criterion to result in an analyzed determined first transitioning number

1215 based on the analyzed determined first transitioning number failing to satisfy the mode transitioning criterion, allocating at least one uplink resource to be associated with a group of downlink beams that comprises the first at least one downlink beam, corresponding to a first beam direction, and a second downlink beam of the at least one downlink beam, corresponding to a second beam direction, to result in an at least one allocated group uplink resource

1220 broadcasting a reduced-capability connection establishment information indication indicative of the at least one allocated group uplink resource and group random-access information usable to transmit uplink emergency traffic to the radio network node, during a discontinuous receive off period enabled at least in part by the radio network node, by user equipment that have determined the at least one first downlink beam or the second downlink beam as being an optimal downlink beam

1225 monitoring, during the discontinuous receive off period, the allocated at least one uplink resource with respect to a composite beam direction

1230 avoiding, during the discontinuous receive off period, monitoring uplink resources with respect to the first beam direction and the second beam direction

A non-transitory machine-readable medium, comprising executable instructions that, when executed by at least one processor of a radio network node, facilitate performance of operations, comprising:
receiving, from a core network device, a reduced-capability connection establishment criterion configuration, comprising a mode transitioning criterion   1305

with respect to a first downlink beam corresponding to the radio network node, determining a first number of user equipment transitioning to a connected mode with respect to the radio network node to result in a determined first transitioning number   1310 analyzing the determined first transitioning number with respect to the mode transitioning criterion to result in an analyzed determined first transitioning number   1315 based on the analyzed determined first transitioning number failing to satisfy the mode transitioning criterion, allocating at least one group uplink resource to be associated with a group of beam pairs that comprises a first beam pair corresponding to the first downlink beam and corresponding to a first beam direction, and a second beam pair, corresponding to the radio network node and corresponding to a second beam direction, to result in an at least one allocated group uplink resource   1320

determining, according to a function with respect to at least the first beam pair and the second beam pair, a composite uplink beam direction   1325

broadcasting a reduced-capability connection establishment information indication indicative of the at least one allocated group uplink resource usable to transmit emergency uplink traffic to the radio network node, during a discontinuous receive off period to be enabled at least in part by the radio network node, by user equipment that have determined the first downlink beam or a second downlink beam of the second beam pair as being an optimal downlink beam   1330

enabling, at least in part, a discontinuous receive off period, at least with respect to the first downlink beam and the second downlink beam, to result in an enabled discontinuous receive off period   1335

receiving, via the at least one allocated group uplink resource according to the composite uplink beam direction during the enabled discontinuous receive off period from an idle user equipment that has determined a first downlink beam or a second downlink beam, corresponding to the first beam pair or the second beam pair, respectively, as being an optimal downlink beam, an uplink preamble   1340

based on the receiving of the uplink preamble, establishing a connection with the idle user equipment   1345

Figure 14:
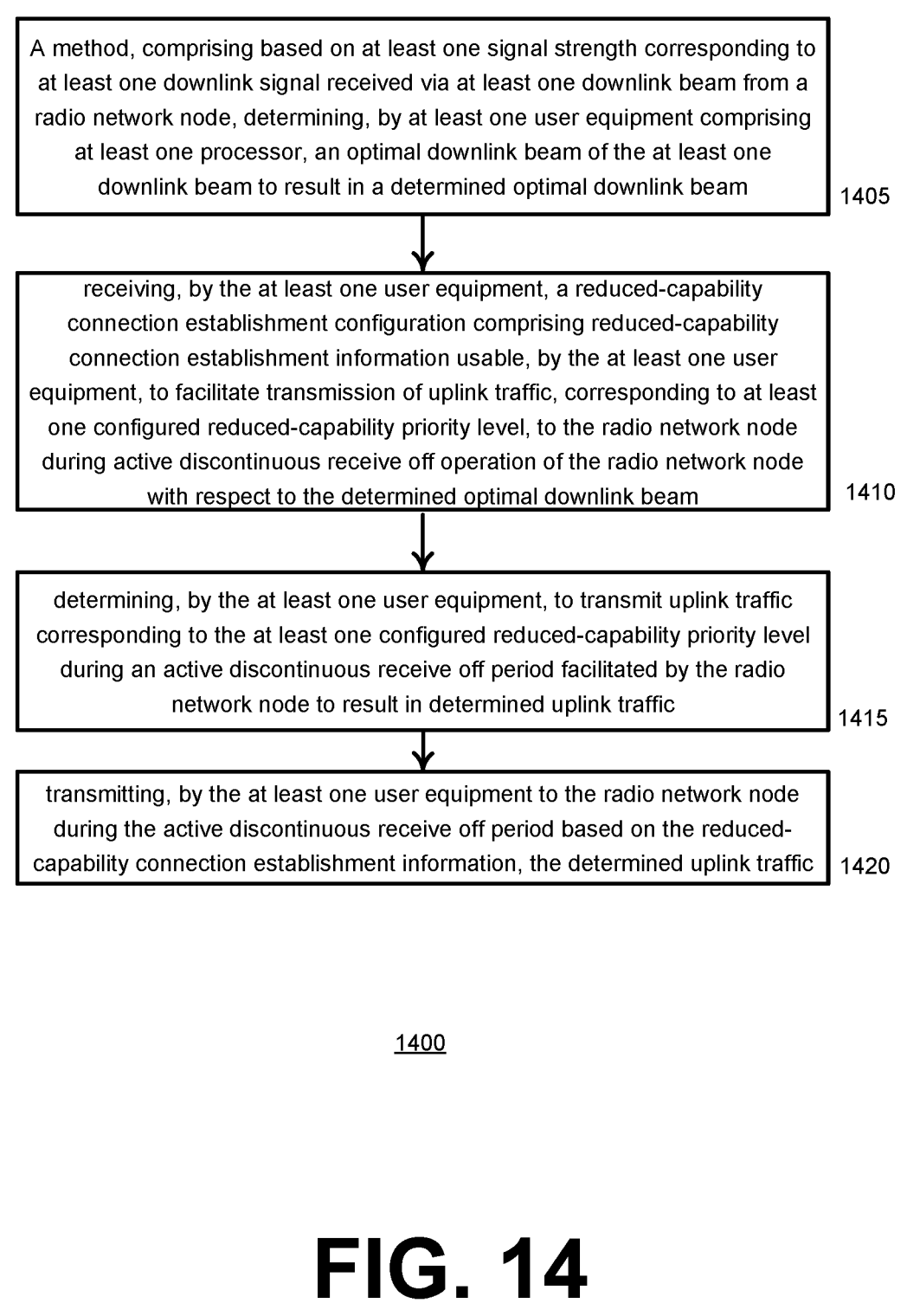

A method, comprising based on at least one signal strength corresponding to at least one downlink signal received via at least one downlink beam from a radio network node, determining, by at least one user equipment comprising at least one processor, an optimal downlink beam of the at least one downlink beam to result in a determined optimal downlink beam    1405 receiving, by the at least one user equipment, a reduced-capability connection establishment configuration comprising reduced-capability connection establishment information usable, by the at least one user equipment, to facilitate transmission of uplink traffic, corresponding to at least one configured reduced-capability priority level, to the radio network node during active discontinuous receive off operation of the radio network node with respect to the determined optimal downlink beam    1410 determining, by the at least one user equipment, to transmit uplink traffic corresponding to the at least one configured reduced-capability priority level during an active discontinuous receive off period facilitated by the radio network node to result in determined uplink traffic    1415 transmitting, by the at least one user equipment to the radio network node during the active discontinuous receive off period based on the reduced-capability connection establishment information, the determined uplink traffic    1420

Figure 15:
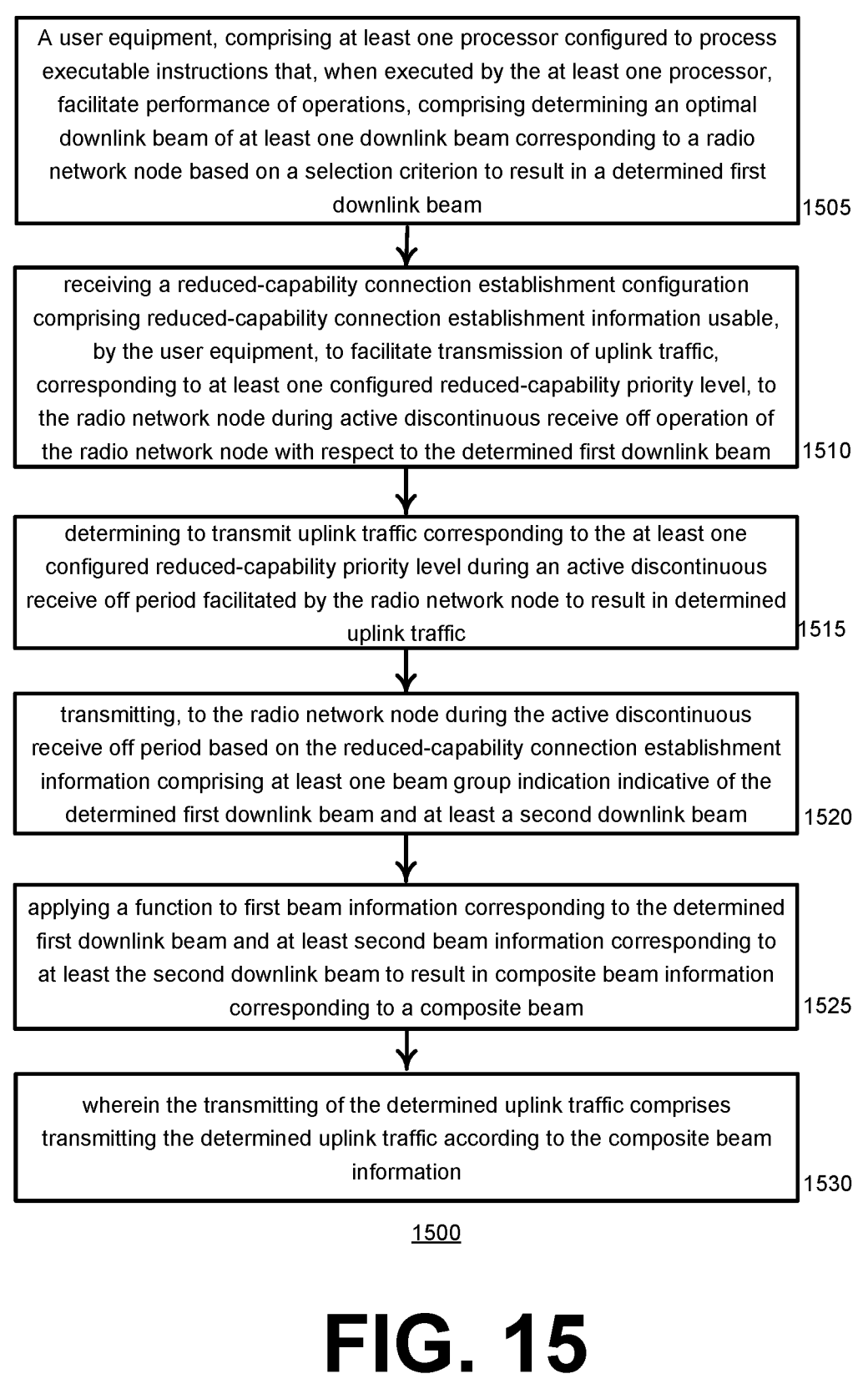

A user equipment, comprising at least one processor configured to process executable instructions that, when executed by the at least one processor, facilitate performance of operations, comprising determining an optimal downlink beam of at least one downlink beam corresponding to a radio network node based on a selection criterion to result in a determined first downlink beam
1505 receiving a reduced-capability connection establishment configuration comprising reduced-capability connection establishment information usable, by the user equipment, to facilitate transmission of uplink traffic, corresponding to at least one configured reduced-capability priority level, to the radio network node during active discontinuous receive off operation of the radio network node with respect to the determined first downlink beam
1510 determining to transmit uplink traffic corresponding to the at least one configured reduced-capability priority level during an active discontinuous receive off period facilitated by the radio network node to result in determined uplink traffic
1515 transmitting, to the radio network node during the active discontinuous receive off period based on the reduced-capability connection establishment information comprising at least one beam group indication indicative of the determined first downlink beam and at least a second downlink beam
1520 applying a function to first beam information corresponding to the determined first downlink beam and at least second beam information corresponding to at least the second downlink beam to result in composite beam information corresponding to a composite beam
1525 wherein the transmitting of the determined uplink traffic comprises transmitting the determined uplink traffic according to the composite beam information
1530

Figure 16:
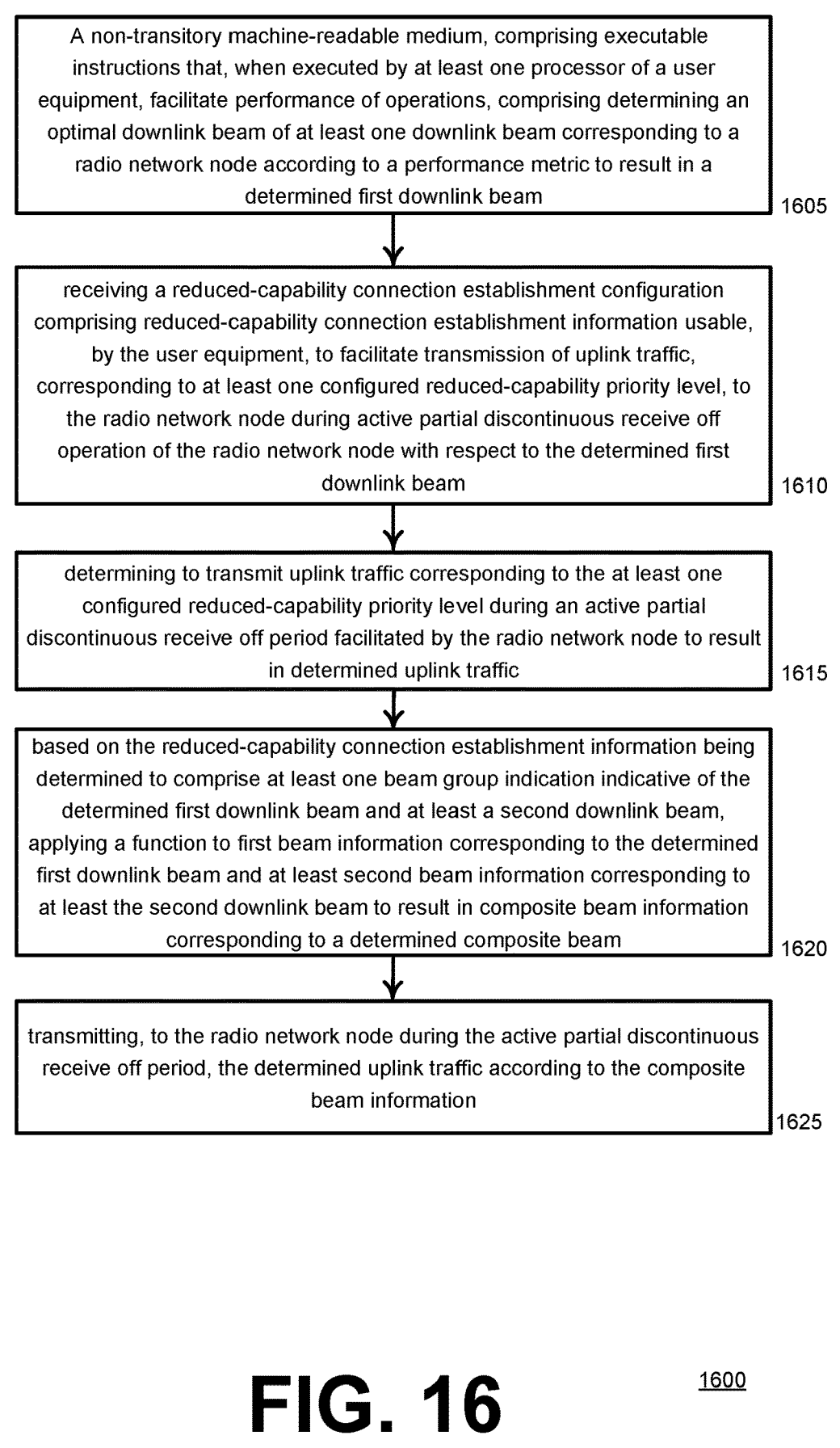

A non-transitory machine-readable medium, comprising executable instructions that, when executed by at least one processor of a user equipment, facilitate performance of operations, comprising determining an optimal downlink beam of at least one downlink beam corresponding to a radio network node according to a performance metric to result in a determined first downlink beam

1605 receiving a reduced-capability connection establishment configuration comprising reduced-capability connection establishment information usable, by the user equipment, to facilitate transmission of uplink traffic, corresponding to at least one configured reduced-capability priority level, to the radio network node during active partial discontinuous receive off operation of the radio network node with respect to the determined first downlink beam

1610 determining to transmit uplink traffic corresponding to the at least one configured reduced-capability priority level during an active partial discontinuous receive off period facilitated by the radio network node to result in determined uplink traffic

1615 based on the reduced-capability connection establishment information being determined to comprise at least one beam group indication indicative of the determined first downlink beam and at least a second downlink beam, applying a function to first beam information corresponding to the determined first downlink beam and at least second beam information corresponding to at least the second downlink beam to result in composite beam information corresponding to a determined composite beam

1620 transmitting, to the radio network node during the active partial discontinuous receive off period, the determined uplink traffic according to the composite beam information

ENERGY-EFFICIENT BEAM-GROUP RANDOM ACCESS

BACKGROUND

The 'New Radio' (NR) terminology that is associated with fifth generation mobile wireless communication systems ("5G") refers to technical aspects used in wireless radio access networks ("RAN") that comprise several quality-of-service classes (QOS), including ultrareliable and low latency communications ("URLLC"), enhanced mobile broadband ("eMBB"), and massive machine type communication ("mMTC"). The URLLC QoS class is associated with a stringent latency requirement (e.g., low latency or low signal/message delay) and a high reliability of radio performance, while conventional eMBB use cases may be associated with high-capacity wireless communications, which may permit less stringent latency requirements (e.g., higher latency than URLLC) and less reliable radio performance as compared to URLLC. Performance requirements for mMTC may be lower than for eMBB use cases. Some use case applications involving mobile devices or mobile user equipment such as smart phones, wireless tablets, smart watches, and the like, may impose on a given RAN resource loads, or demands, that vary.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

In an example embodiment, a method may comprise facilitating, by a radio network node comprising at least one processor, receiving, from network equipment, a reduced-capability connection establishment criterion configuration, comprising at least one mode transitioning criterion. With respect to at least one first beam corresponding to the radio network node, the method may further comprise determining, by the radio network node, a first number of user equipment transitioning to a connected mode with respect to the radio network node to result in a determined first transitioning number, and analyzing, by the radio network node, the determined first transitioning number with respect to the at least one mode transitioning criterion to result in an analyzed determined first transitioning number. Based on the analyzed determined first transitioning number failing to satisfy the at least one mode transitioning criterion, the method may comprise determining, by the radio network node, reduced-capability connection establishment information to be associated with, during a discontinuous receive off period to be enabled at least in part by the radio network node, a beam group that comprises the at least one first beam and a second beam, and broadcasting, by the radio network node, a reduced-capability connection establishment information indication indicative of the reduced-capability connection establishment information usable, by at least one idle user equipment, to facilitate transmission of uplink traffic to the radio network node during the discontinuous receive off period.

Based on first and second received signal strengths respectively corresponding to first and second downlink signals respectively received according to the at least one first beam and the second beam, the at least one idle user equipment may have determined, before the discontinuous receive off period, a first beam of the at least one first beam or the second beam as being an optimal downlink beam according to at least one beam selection metric.

In an embodiment, the method may further comprise allocating, by the radio network node, at least one uplink resource to be associated with the beam group to result in at least one allocated group uplink resource. The reduced-capability connection establishment information may comprise a group uplink resource indication indicative of the at least one allocated group uplink resource. The reduced-capability connection establishment information further may comprise at least one group random access preamble usable by the at least one idle user equipment to establish a connection with the radio network node according to the at least one allocated group uplink resource. In an embodiment, the reduced-capability connection establishment information may further comprise a reduced-service indication indicative of at least one service that is to be facilitated by the radio network node during the discontinuous receive off period.

The reduced-capability connection establishment information may further comprise at least one group random access preamble, associated with the at least one service, usable by the at least one idle user equipment to establish a connection with the radio network node according to the at least one allocated group uplink resource. The method may further comprise receiving, by the radio network node from the at least one idle user equipment during the discontinuous receive off period, the at least one group random access preamble. Based on the receiving of the at least one group random access preamble, the method may further comprise facilitating, by the radio network node, providing the at least one service to the at least one idle user equipment during the discontinuous receive off period. The at least one service may be an emergency service. The emergency service may comprise facilitation of an emergency number call.

In an embodiment, the method may further comprise determining, by the radio network node according to a function with respect to at least the at least one first beam and the second beam, a composite beam. The reduced-capability connection establishment information may comprise a composite beam direction indication indicative of a composite beam direction corresponding to the composite beam.

The at least one first beam may correspond to a first beam direction. The second beam may correspond to a second beam direction. The composite beam direction may be different than the first beam direction or the second beam direction.

The method may further comprise, during the discontinuous receive off period, avoiding, by the radio network node, receiving signals transmitted according to the first beam direction and the second beam direction.

A first reception performance of the radio network node may be inferior to a second reception performance. The first reception performance may correspond to the composite beam direction during a discontinuous receive off period. The second reception performance may correspond to the first beam direction or the second beam direction during a discontinuous receive off disabled period during which discontinuous receive off is disabled at least in part by the radio network node. The at least one of the at least one user equipment may determine, before the discontinuous receive off period, the at least one first beam or the second beam as being an optimal beam according to at least one beam selection metric.

In another example embodiment, a radio network node may comprise at least one processor configured to process executable instructions that, when executed by the at least one processor, facilitate performance of operations, that may comprise receiving, from core network equipment that is part of a core network, a reduced-capability connection establishment criterion configuration, comprising a mode transitioning criterion. With respect to at least one first downlink beam of at least one downlink beam corresponding to the radio network node, the operations may further comprise determining a first number of user equipment transitioning to a connected mode with respect to the radio network node to result in a determined first transitioning number and analyzing the determined first transitioning number with respect to the mode transitioning criterion to result in an analyzed determined first transitioning number. Based on the analyzed determined first transitioning number failing to satisfy the mode transitioning criterion, the operations may further comprise allocating at least one uplink resource to be associated with a group of downlink beams that comprises the first at least one downlink beam, corresponding to a first beam direction, and a second downlink beam of the at least one downlink beam, corresponding to a second beam direction, to result in an at least one allocated group uplink resource. The operations may further comprise broadcasting a reduced-capability connection establishment information indication indicative of the at least one allocated group uplink resource and group random-access information usable to transmit uplink emergency traffic to the radio network node, during a discontinuous receive off period enabled at least in part by the radio network node, by user equipment that have determined the at least one first downlink beam or the second downlink beam as being an optimal downlink beam.

In an embodiment, the at least one allocated group uplink resource may be at least one first allocated uplink resource corresponding to the first beam direction or at least one second allocated uplink resource corresponding to the second beam direction. The random-access information may be first random-access information. With respect to a third downlink beam of the at least one downlink beam, the operations may further comprise determining a second number of user equipment transitioning to a connected mode with respect to the radio network node to result in a determined second transitioning number, and analyzing the determined second transitioning number with respect to the mode transitioning criterion to result in an analyzed determined second transitioning number. Based on the mode transitioning criterion being satisfied by the analyzed determined second transitioning number, the operations may further comprise determining that second random access information and at least one second uplink resource indication indicative of at least one second uplink resource is to be usable to receive emergency traffic transmitted, during the discontinuous receive off period, by user equipment to the radio network node in a third direction corresponding to the third downlink beam.

The discontinuous receive off period may be enabled with respect to the at least one first downlink beam and the second downlink beam.

In an embodiment, the operations may further comprise monitoring, during the discontinuous receive off period, the allocated at least one uplink resource with respect to a composite beam direction, and avoiding, during the discontinuous receive off period, monitoring uplink resources with respect to the first beam direction and the second beam direction. The at least one first downlink beam and the second downlink beam may be spatially adjacent to each other. The composite beam direction may be spatially oriented between the first beam direction and the second beam direction.

In yet another example embodiment, a non-transitory machine-readable medium may comprise executable instructions that, when executed by at least one processor of a radio network node, facilitate performance of operations that may comprise receiving, from a core network device, a reduced-capability connection establishment criterion configuration, comprising a mode transitioning criterion. With respect to a first downlink beam corresponding to the radio network node, the operations may further comprise determining a first number of user equipment transitioning to a connected mode with respect to the radio network node to result in a determined first transitioning number, and analyzing the determined first transitioning number with respect to the mode transitioning criterion to result in an analyzed determined first transitioning number. Based on the analyzed determined first transitioning number failing to satisfy the mode transitioning criterion, the operations may further comprise allocating at least one group uplink resource to be associated with a group of beam pairs that comprises a first beam pair corresponding to the first downlink beam and corresponding to a first beam direction, and a second beam pair, corresponding to the radio network node and corresponding to a second beam direction, to result in an at least one allocated group uplink resource. The operations may further comprise determining, according to a function with respect to at least the first beam pair and the second beam pair, a composite uplink beam direction, and broadcasting a reduced-capability connection establishment information indication indicative of the at least one allocated group uplink resource usable to transmit emergency uplink traffic to the radio network node, during a discontinuous receive off period to be enabled at least in part by the radio network node, by user equipment that have determined the first downlink beam or a second downlink beam of the second beam pair as being an optimal downlink beam. The operations may further comprise enabling, at least in part, a discontinuous receive off period, at least with respect to the first downlink beam and the second downlink beam, to result in an enabled discontinuous receive off period, and receiving, via the at least one allocated group uplink resource according to the composite uplink beam direction during the enabled discontinuous receive off period from an idle user equipment that has determined a first downlink beam or a second downlink beam, corresponding to the first beam pair or the second beam pair, respectively, as being an optimal downlink beam, an uplink preamble. Based on the receiving of the uplink preamble, the operations may further comprise establishing a connection with the idle user equipment.

In an embodiment, the reduced-capability connection establishment information indication may be further indicative of an emergency preamble. The uplink preamble received from the idle user equipment may be an emergency preamble. The establishing of the connection with the idle user equipment may comprise disabling, at least in part, the discontinuous receive off period, at least with respect to the first beam pair and the second beam pair, to result in a disabled discontinuous receive off period, and broadcasting a system information block signal message indicative to the idle user equipment to use at least one uplink resource corresponding to the optimal downlink beam to transmit a non-emergency preamble to the radio network node during the disabled discontinuous receive off period. The emergency preamble may correspond to, and may be indicative to the radio network node of, an emergency service.

In another example embodiment, a method may comprise, based on at least one signal strength corresponding to at least one downlink signal received via at least one downlink beam from a radio network node, determining, by at least one user equipment comprising at least one processor, an optimal downlink beam of the at least one downlink beam to result in a determined optimal downlink beam. The method may comprise receiving, by the at least one user equipment, a reduced-capability connection establishment configuration comprising reduced-capability connection establishment information usable, by the at least one user equipment, to facilitate transmission of uplink traffic, corresponding to at least one configured reduced-capability priority level, to the radio network node during active discontinuous receive off operation of the radio network node with respect to the determined optimal downlink beam. The method may comprise determining, by the at least one user equipment, to transmit uplink traffic corresponding to the at least one configured reduced-capability priority level during an active discontinuous receive off period facilitated by the radio network node to result in determined uplink traffic. The method may further comprise transmitting, by the at least one user equipment to the radio network node during the active discontinuous receive off period based on the reduced-capability connection establishment information, the determined uplink traffic.

The reduced-capability connection establishment configuration may comprise at least one of: discontinuous receive off timing information defining at least one active discontinuous receive off period with respect to the radio network node, the at least one configured reduced-capability priority level, at least one reduced-capability random access preamble, at least one reduced-capability time uplink resource indication or at least one reduced-capability frequency uplink resource indication indicative of at least one reduced-capability time uplink resource or at least one reduced-capability frequency uplink resource, or at least one downlink beam group indication.

The at least one configured reduced-capability priority level may be associated with at least one traffic type, service type, or quality-of-service type with respect to which the radio network node is configured to receive, from the at least one user equipment, uplink traffic during an active discontinuous receive off period. The at least one configured reduced-capability priority level may be associated with an emergency traffic type, an emergency service type, or an emergency quality-of-service type.

In an embodiment, the method may further comprise processing the uplink traffic to be transmitted to the radio network node to result in processed traffic. The determining to transmit the uplink traffic corresponding to the at least one configured reduced-capability priority level may comprise analyzing the processed traffic with respect to the at least one configured reduced-capability priority level to result in analyzed processed traffic. Based on the analyzed processed traffic corresponding to at least one of the at least one configured reduced-capability priority level, the method may further comprise determining to transmit, to the radio network node during the active discontinuous receive off operation, the analyzed processed traffic.

In an embodiment, the processed traffic may be first processed traffic. The method may further comprise processing second uplink traffic to be transmitted to the radio network node to result in second processed traffic, and analyzing the second processed traffic with respect to the at least one configured reduced-capability priority level to result in analyzed second processed traffic. Based on a lack of correspondence of the analyzed second processed traffic corresponding to at least one of the at least one configured reduced-capability priority level, the method may further comprise determining to buffer, in a buffer corresponding to the at least one user equipment during the active discontinuous receive off operation, the analyzed second processed traffic.

In an embodiment, the reduced-capability connection establishment information may comprise composite beam information associated with a composite beam corresponding to a group of beams that comprises the determined optimal downlink beam, and wherein the determined uplink traffic is transmitted according to the composite beam information. The composite beam information may comprise composite beam precoding vector information corresponding to the composite beam. In an embodiment, the user equipment may determine the composite beam precoding vector.

In an embodiment, the determined uplink traffic may comprise a reduced-capability random access preamble indicative to the radio network node that the determined uplink traffic further comprises priority traffic that corresponds to the at least one configured reduced-capability priority level.

In an embodiment, the determined optimal downlink beam may be a first beam. The reduced-capability connection establishment information may comprise at least one beam group indication indicative of the first beam and at least a second beam. The method may further comprise applying, by the at least one user equipment, a function to first beam information corresponding to the first beam and at least second beam information corresponding to at least the second beam to result in composite beam information corresponding to a determined composite beam. The transmitting of the determined uplink traffic may comprise transmitting the determined uplink traffic according to the composite beam information.

The first beam information may comprise a first beam direction indication indicative of a first beam direction corresponding to the first beam. At least the second beam information may comprise at least a second beam direction indication indicative of at least a second beam direction corresponding to at least the second beam. The composite beam information may comprise a composite beam direction corresponding to the determined composite beam.

The determined uplink traffic may comprise a reduced-capability random access preamble indicative to the radio network node that the determined uplink traffic further comprises priority traffic that corresponds to the at least one configured reduced-capability priority level. The reduced-capability random access preamble may be a first random-access preamble. Responsive to transmitting the reduced-capability random access preamble, the method may further comprise receiving, by the at least one user equipment from the radio network node, a reduced-capability system information block message comprising full-capability random access information. Based on the full-capability random access information, the method may further comprise transmitting, by the at least one user equipment to the radio network node, a second uplink random access preamble via at least one random access resource associated with the first beam. Based on transmitting the second uplink random access preamble, the method may further comprise transitioning, by the at least one user equipment, to a connected state with respect to the radio network node to result in an established connection. The method may comprise transmitting, by the at least one user equipment to the radio network node via the established connection, the priority traffic.

In an embodiment, the reduced-capability connection establishment information may comprise at least one beam group indication indicative of the determined optimal downlink beam. The determined uplink traffic may be transmitted according to optimal beam information corresponding to the determined optimal downlink beam. The optimal beam information may be usable to transmit uplink traffic to the radio network node during inactive discontinuous receive off operation of the radio network node. The determined uplink traffic may comprise a reduced-capability random access preamble indicative to the radio network node that the determined uplink traffic further comprises traffic that corresponds to the at least one configured reduced-capability priority level.

In another example embodiment, a user equipment may comprise at least one processor configured to process executable instructions that, when executed by the at least one processor, facilitate performance of operations that may comprise determining an optimal downlink beam of at least one downlink beam corresponding to a radio network node based on a selection criterion to result in a determined first downlink beam. The operations may further comprise receiving a reduced-capability connection establishment configuration comprising reduced-capability connection establishment information usable, by the user equipment, to facilitate transmission of uplink traffic, corresponding to at least one configured reduced-capability priority level, to the radio network node during active discontinuous receive off operation of the radio network node with respect to the determined first downlink beam. The operations may comprise determining to transmit uplink traffic corresponding to the at least one configured reduced-capability priority level during an active discontinuous receive off period facilitated by the radio network node to result in determined uplink traffic. The operations may comprise transmitting, to the radio network node during the active discontinuous receive off period based on the reduced-capability connection establishment information comprising at least one beam group indication indicative of the determined first downlink beam and at least a second downlink beam. The operations may further comprise applying a function to first beam information corresponding to the determined first downlink beam and at least second beam information corresponding to at least the second downlink beam to result in composite beam information corresponding to a composite beam. The transmitting of the determined uplink traffic may comprise transmitting the determined uplink traffic according to the composite beam information.

In an embodiment the operations may further comprise processing the uplink traffic to be transmitted to the radio network node to result in processed traffic. The determining to transmit the uplink traffic corresponding to the at least one configured reduced-capability priority level may comprise analyzing the processed traffic with respect to the at least one configured reduced-capability priority level to result in analyzed processed traffic. Based on the analyzed processed traffic corresponding to at least one of the at least one configured reduced-capability priority level, the operations may further comprise determining to transmit, to the radio network node during the active discontinuous receive off operation, the analyzed processed traffic.

The first beam information may comprise a first beam direction indication indicative of a first beam direction corresponding to the determined first downlink beam. The at least second beam information may comprise at least a second beam direction indication indicative of at least a second beam direction corresponding to at least the second downlink beam. The composite beam information may comprise a composite beam direction corresponding to the composite beam.

In an embodiment, the determined uplink traffic may comprise a reduced-capability random access preamble indicative to the radio network node that the determined uplink traffic further comprises priority traffic that corresponds to the at least one configured reduced-capability priority level. The reduced-capability random access preamble may be a first random-access preamble. Responsive to transmitting the reduced-capability random access preamble, the operations may further comprise receiving, by the user equipment from the radio network node, a reduced-capability system information block message comprising full-capability random access information. Based on the full-capability random access information, the operations may further comprise transmitting, by the user equipment to the radio network node, a second uplink random access preamble via at least one random access resource associated with the determined first downlink beam. Based on transmitting the second uplink random access preamble, the operations may comprise transitioning, by the user equipment, to a connected state with respect to the radio network node to result in an established connection, and transmitting, by the user equipment to the radio network node via the established connection, the priority traffic.

In yet another example embodiment, a non-transitory machine-readable medium may comprise executable instructions that, when executed by at least one processor of a user equipment, facilitate performance of operations that may comprise determining an optimal downlink beam of at least one downlink beam corresponding to a radio network node according to a performance metric to result in a determined first downlink beam. The operations may further comprise receiving a reduced-capability connection establishment configuration comprising reduced-capability connection establishment information usable, by the user equipment, to facilitate transmission of uplink traffic, corresponding to at least one configured reduced-capability priority level, to the radio network node during active partial discontinuous receive off operation of the radio network node with respect to the determined first downlink beam. The operations may further comprise determining to transmit uplink traffic corresponding to the at least one configured reduced-capability priority level during an active partial discontinuous receive off period facilitated by the radio network node to result in determined uplink traffic. Based on the reduced-capability connection establishment information being determined to comprise at least one beam group indication indicative of the determined first downlink beam and at least a second downlink beam, the operations may further comprise applying a function to first beam information corresponding to the determined first downlink beam and at least second beam information corresponding to at least the second downlink beam to result in composite beam information corresponding to a determined composite beam. The operations may further comprise transmitting, to the radio network node during the active partial discontinuous receive off period, the determined uplink traffic according to the composite beam information.

The reduced-capability connection establishment information may comprise at least one beam group indication indicative of the determined first downlink beam. The determined uplink traffic may be transmitted according to optimal beam information corresponding to the determined first downlink beam. The optimal beam information may be usable to transmit uplink traffic to the radio network node during inactive discontinuous receive off operation of the radio network node. The determined uplink traffic may comprise a reduced-capability random access preamble indicative to the radio network node that the determined uplink traffic further comprises traffic that corresponds to the at least one configured reduced-capability priority level.

BRIEF DESCRIPTION OF THE DRAWINGS

FIG. 3 illustrates an example reduced-capability connection establishment criterion configuration.

FIG. 8 illustrates timing diagram of a radio network node using reduced-capability resources to facilitate connection establishment of user equipment during discontinuous receive operation of a radio network node.

FIG. 9 illustrates a timing diagram of a user equipment using reduced-capability resources to initiate establishment of a connection with a radio network node during discontinuous receive operation of the radio network node.

FIG. 10 illustrates a flow diagram of an example method to facilitate an idle user equipment establish a connection with a radio network node during discontinuous receive operation of the node.

FIG. 11 illustrates a block diagram of an example method.

FIG. 12 illustrates a block diagram of an example radio network node.

FIG. 13 illustrates a block diagram of an example non-transitory machine-readable medium.

FIG. 14 illustrates a block diagram of an example method.

FIG. 15 illustrates a block diagram of an example user equipment.

FIG. 16 illustrates a block diagram of an example non-transitory machine-readable medium.

DETAILED DESCRIPTION OF THE DRAWINGS

Figure 1:
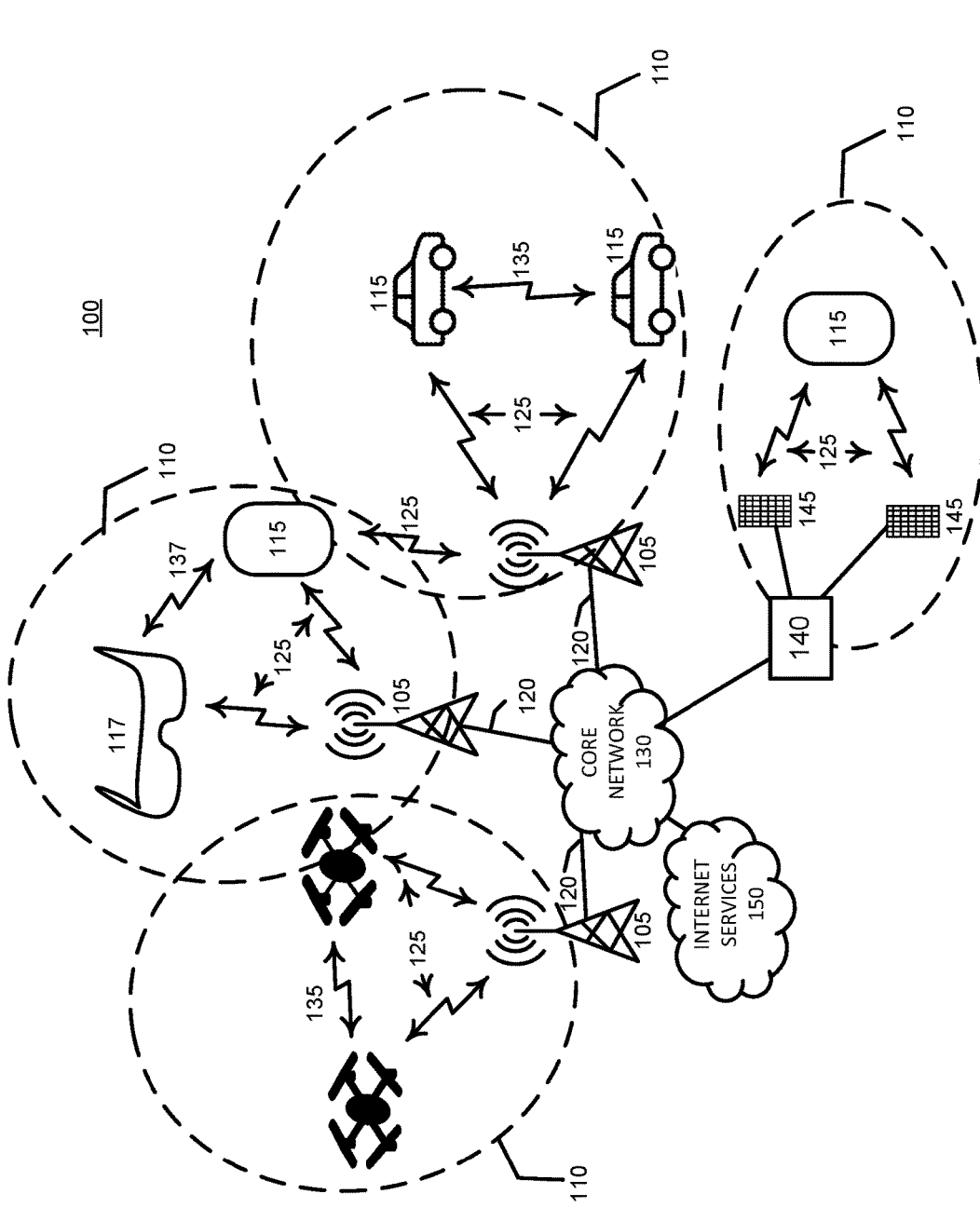
FIG. 1 illustrates wireless communication system environment.

As a preliminary matter, it will be readily understood by those persons skilled in the art that the present embodiments are susceptible of broad utility and application. Many methods, embodiments, and adaptations of the present application other than those herein described as well as many variations, modifications and equivalent arrangements, will be apparent from or reasonably suggested by the substance or scope of the various embodiments of the present application.

Accordingly, while the present application has been described herein in detail in relation to various embodiments, it is to be understood that this disclosure is illustrative of one or more concepts expressed by the various example embodiments and is made merely for the purposes of providing a full and enabling disclosure. The following disclosure is not intended nor is to be construed to limit the present application or otherwise exclude any such other embodiments, adaptations, variations, modifications and equivalent arrangements, the present embodiments described herein being limited only by the claims appended hereto and the equivalents thereof.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

The term "facilitate" as used herein is in the context of a system, device or component "facilitating" one or more actions or operations, in respect of the nature of complex computing environments in which multiple components and/or multiple devices can be involved in some computing operations. Non-limiting examples of actions that may or may not involve multiple components and/or multiple devices comprise transmitting or receiving data, establishing a connection between devices, determining intermediate results toward obtaining a result, etc. In this regard, a computing device or component can facilitate an operation by playing any part in accomplishing the operation. When operations of a component are described herein, it is thus to be understood that where the operations are described as facilitated by the component, the operations can be optionally completed with the cooperation of one or more other computing devices or components, such as, but not limited to, sensors, antennae, audio and/or visual output devices, other devices, etc.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Artificial intelligence ("AI") and machine learning ("ML") models may facilitate performance and operational functionality and improvements in 5G implementation, such as, for example, network automation, optimizing signaling overhead, energy conservation at devices, and traffic-capacity maximization. An artificial intelligence machine learning models ("AI/ML model") functionality can be implemented and structured in many different forms and with varying vendor-proprietary designs. A 5G radio access network node ("RAN") of a network to which the user equipment may be attached or with which the user equipment may be registered may manage or control real-time AI/ML model performance at different user equipment devices for various radio functions.

Turning now to the figures, FIG. 1 illustrates an example of a wireless communication system 100 that supports blind decoding of PDCCH candidates or search spaces in accordance with aspects of the present disclosure. The wireless communication system 100 may include one or more base stations 105, one or more UEs 115, and core network 130. In some examples, the wireless communication system 100 may be a Long-Term Evolution (LTE) network, an LTE-Advanced (LTE-A) network, an LTE-A Pro network, or a New Radio (NR) network. In some examples, the wireless communication system 100 may support enhanced broadband communications, ultra-reliable (e.g., mission critical) communications, low latency communications, communications with low-cost and low-complexity devices, or any combination thereof. As shown in the figure, examples of UEs 115 may include smart phones, automobiles or other vehicles, or drones or other aircraft. Another example of a UE may be a virtual reality appliance 117, such as smart glasses, a virtual reality headset, an augmented reality headset, and other similar devices that may provide images, video, audio, touch sensation, taste, or smell sensation to a wearer. A UE, such as VR appliance 117, may transmit or receive wireless signals with a RAN base station 105 via a long-range wireless link 125, or the UE/VR appliance may receive or transmit wireless signals via a short-range wireless link 137, which may comprise a wireless link with a UE device 115, such as a Bluetooth link, a Wi-Fi link, and the like. A UE, such as appliance 117, may simultaneously communicate via multiple wireless links, such as over a link 125 with a base station 105 and over a short-range wireless link. VR appliance 117 may also communicate with a wireless UE via a cable, or other wired connection. A RAN, or a component thereof, may be implemented by one or more computer components that may be described in reference to FIG. 17.

Continuing with discussion of FIG. 1, base stations 105 may be dispersed throughout a geographic area to form the wireless communication system 100 and may be devices in different forms or having different capabilities. The base stations 105 and the UEs 115 may wirelessly communicate via one or more communication links 125. Each base station 105 may provide a coverage area 110 over which UEs 115 and the base station 105 may establish one or more communication links 125. Coverage area 110 may be an example of a geographic area over which a base station 105 and a UE 115 may support the communication of signals according to one or more radio access technologies.

UEs 115 may be dispersed throughout a coverage area 110 of the wireless communication system 100, and each UE 115 may be stationary, or mobile, or both at different times. UEs 115 may be devices in different forms or having different capabilities. Some example UEs 115 are illustrated in FIG. 1. UEs 115 described herein may be able to communicate with various types of devices, such as other UEs 115, base stations 105, or network equipment (e.g., core network nodes, relay devices, integrated access and backhaul (IAB) nodes, or other network equipment), as shown in FIG. 1.

Base stations 105 may communicate with the core network 130, or with one another, or both. For example, base stations 105 may interface with core network 130 through one or more backhaul links 120 (e.g., via an S1, N2, N3, or other interface). Base stations 105 may communicate with one another over the backhaul links 120 (e.g., via an X2, Xn, or other interface) either directly (e.g., directly between base stations 105), or indirectly (e.g., via core network 130), or both. In some examples, backhaul links 120 may comprise one or more wireless links.

One or more of base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a bNodeB or gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, a personal computer, or a router. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, vehicles, or smart meters, among other examples.

UEs 115 may be able to communicate with various types of devices, such as other UEs 115 that may sometimes act as relays as well as base stations 105 and the network equipment including macro eNBs or gNBs, small cell eNBs or gNBs, or relay base stations, among other examples, as shown in FIG. 1.

UEs 115 and base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. Wireless communication system 100 may support communication with a UE 115 using carrier aggregation or multicarrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by UEs 115. A carrier may be operated in a standalone mode where initial acquisition and connection may be conducted by UEs 115 via the carrier, or the carrier may be operated in a non-standalone mode where a connection is anchored using a different carrier (e.g., of the same or a different radio access technology).

Communication links 125 shown in wireless communication system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications e.g., in a TDD mode).

A carrier may be associated with a particular bandwidth of the radio frequency spectrum, and in some examples the carrier bandwidth may be referred to as a "system bandwidth" of the carrier or the wireless communication system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communication system 100 (e.g., the base stations 105, the UEs 115, or both) may have hardware configurations that support communications over a particular carrier bandwidth or may be configurable to support communications over one of a set of carrier bandwidths. In some examples, the wireless communication system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE. A wireless communications resource may refer to a combination of a radio frequency spectrum resource, a time resource (e.g., a search space), or a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for a UE 115 may be restricted to one or more active BWPs.

The time intervals for base stations 105 or UEs 115 may be expressed in multiples of a basic time unit which may, for example, refer to a sampling period of $T_s = 1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods e.g., depending on the length of the cyclic prefix prepended to each symbol period). In some wireless communication systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communication system 100 and may be referred to as a transmission time interval (TTI). In some examples, the TTI duration (e.g., the number of symbol periods in a TTI) may be variable. Additionally, or alternatively, the smallest scheduling unit of the wireless communication system 100 may be dynamically selected (e.g., in bursts of shortened TTIs (STTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region e.g., a control resource set (CORE-SET)) for a physical control channel may be defined by a number of symbol periods and may extend across the system bandwidth or a subset of the system bandwidth of the carrier. One or more control regions (e.g., CORESETs) may be configured for a set of UEs 115. For example, one or more of UEs 115 may monitor or search control regions, or spaces, for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115. Other search spaces and configurations for monitoring and decoding them are disclosed herein that are novel and not conventional.

A base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of a base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., UEs 115 in a closed subscriber group (CSG), UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communication system 100 may include, for example, a heterogeneous network in which different types of the base stations 105 provide coverage for various geographic coverage areas 110 using the same or different radio access technologies.

The wireless communication system 100 may support synchronous or asynchronous operation. For synchronous operation, the base stations 105 may have similar frame timings, and transmissions from different base stations 105 may be approximately aligned in time. For asynchronous operation, base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communication system 100 may be configured to support ultra-reliable communications or low-latency communications, or various combinations thereof. For example, the wireless communication system 100 may be configured to support ultra-reliable low-latency communications (URLLC) or mission critical communications. UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). Communication link 135 may comprise a sidelink communication link. One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of UEs 115 communicating via D2D communications may utilize a one-to-many (1:M) system in which a UE transmits to every other UE in the group. In some examples, a base station 105 facilitates the scheduling of resources for D2D communications. In other cases, D2D communications are carried out between UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more RAN network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. Core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for UEs 115 that are served by the base stations 105 associated with core network 130. User IP packets may be transferred through the user plane entity, which may provide IP address allocation as well as other functions. The user plane entity may be connected to IP services 150 for one or more network operators. IP services 150 may comprise access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices e.g., radio heads and ANCs) or consolidated into a single network device (e.g., a base station 105).

The wireless communication system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communication system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communication system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communication system 100 may utilize both licensed and unlicensed radio frequency spectrum bands. For example, the wireless communication system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as base stations 105 and UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

Base stations 105 or UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, a base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by a base station 105 in different directions and may report to the base station an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). A UE 115 may report feedback that indicates precoding weights for one or more beam directions, and the feedback may correspond to a configured number of beams across a system bandwidth or one or more sub-bands. A base station 105 may transmit a reference signal (e.g., a cell-specific reference signal (CRS), a channel state information reference signal (CSI-RS)), which may be precoded or unprecoded. A UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communication system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Network energy saving ("NES") is a desirable objective to decrease energy use by radio network equipment while not impacting network performance with respect to user equipment. NES may be achieved when a RAN node dynamically relaxes operation of energy-heavy radio functionality for a period. Such radio function relaxation may be useful during very low traffic loading of a RAN node or during a sudden disruption of a power source corresponding to a radio network node when minimizing power consumption from a backup battery is desirable.

Conventional NES techniques may comprise aggregating of paging occasions wherein multiple user equipment are configured to monitor and blindly decode the same paging occasion. Such aggregating of paging occasions monitored by user equipment may reduce a total number of paging occasions a RAN node may facilitate and thus may reduce time that a RAN node transmitter is activated to transmit paging messages. However, aggregating of paging occasions may increase a number of idle user equipment waking up to monitor and decode an aggregated paging occasion despite delivery of a paging message via an aggregated occasion being directed to a single user equipment (e.g., such waking up by a user equipment to monitor a paging occasion that does not comprise a paging message directed to the user equipment may be referred to as a false alarm). Accordingly, achievable NES gain can be offset by increased energy consumption by user equipment due to the significantly degraded paging performance caused by false alarms.

Another conventional NES technique may comprise RAN nodes shutting down or not admitting new connections from user equipment. Such rejecting of connection requests is a simple NES solution, but may negatively impact satisfaction at user equipment of Quality-of-service targets due to the RAN node rejecting connection request during a configured period during which the RAN node is not accepting connection establishment requests. Rejecting new connection establishment requests according to conventional techniques may also lead to coverage gaps, wherein a user equipment operating in an idle mode may become unable to detect the RAN node and thus may not attempt connecting to the node. Inability to connect to a RAN node may create a safety risk in case of a request for emergency services by a user equipment.

Network discontinuous reception ("DRX") is a conventional technique that may facilitate network energy saving. Network full DRX may refer to techniques wherein a RAN node fully shuts down receivers with respect to all uplink radio signals and thus the RAN node skips receiving respective radio signals, including receiving of data and control payload during active DRX periods, which may result in significant NES gains. However, performance with respect to some essential uplink radio aspects, (e.g., uplink random access of idle mode devices) may become sporadic with respect to time, which may cause a RAN node to limit DRX off period(s) to minimize failure to receive essential uplink signals transmitted by user equipment that would uplink traffic delivery performance. For example, an idle mode user equipment device may determine, sporadically with respect to time, to transmit a network random access request for connection establishment, but if a selected RAN node to which the request is transmitted is in an active DRX off period the uplink access requests may be lost, thus degrading general RAN access performance (e.g., the RAN node may fail to receive an emergency call attempt from a user equipment which does not satisfy cellular network regulations for handling of emergency traffic). Thus, conventional DRX off techniques, that are static and absolute (e.g., a RAN shuts down completely all or part of active receivers resulting in some uplink functionalities being fully deactivated during a DRX off periods) typically result in degradation of overall uplink traffic delivery performance or duration of active DRX off periods may be effectively restricted to avoid being active during some of, or all of, uplink resource that may be configured to carry essential uplink access requests, thus reducing effective NES gain.

Conventional random-access requires that each available beam corresponding to a RAN node be associated with a certain random access uplink resource set usable for a user equipment to transmit, to the RAN node, access request message signals via a beam that the user equipment determines, or detects, as a best beam (e.g., a downlink beam being determined by the user equipment as satisfying a selection criterion, for example having a strongest signal strength at the user equipment with respect to other beams facilitated by the RAN node). In case of an active DRX off at the RAN node, all previously available random access uplink resource sets are cancelled and will not be monitored by the RAN node, thus potentially missing emergency or high priority access requests from user equipment. According to embodiments disclosed herein, a random-access resource set may be associated with, or mapped to, a subset of beams, which may be referred to as a beam group, that the RAN node may facilitate. By only monitoring a random-access resource set associated with a beam group, the RAN may reduce the number of resource sets that the RAN monitor during DRX off periods that may carry potential emergency access requests, thus reducing energy consumption while still facilitating receiving emergency access request.

Using conventional techniques, a RAN node statically monitors and receives uplink traffic transmitted according to allocated uplink resource sets corresponding respectively to all available beams that the RAN node is configured to facilitate. Embodiments disclosed herein may facilitate a RAN node monitoring and receiving uplink signals via only a subset of allocated uplink resource sets corresponding to one or more subsets of beams or adaptively selecting certain beam groups for being enabled for full random access operation or other certain beams to be enabled for reduced capability random access based on real-time impact to user equipment access performance with respect to the RAN node.

Conventional random-access techniques require that a single uplink resource set is associated with a single beam, wherein each user equipment device first determines which beam (e.g., a best beam or an optimal beam) delivers a strongest coverage level, and accordingly adopts and uses an uplink resource set associated with the best/optimal beam. According to embodiments disclosed herein, a single uplink resource set may be associated with a beam group instead of being associated with a single beam. User equipment may adopt one or more precoding encoding vectors that are specific to a beam group, which may comprise a single beam that is determined to be an 'important' beam, to facilitate emergency uplink access during RAN DRX off operation, wherein a precoding vector that is specific to a beam group may be different than a precoding vector that corresponds to non-emergency uplink access during normal non-DRX off periods, which may be referred to as inactive, or deactivated, DRX off periods.

Conventional random-access techniques typically comprise a single operation from idle user equipment to establish a connection with a radio network node (e.g., a user equipment transmits a single preamble transmission towards the selected RAN node for connection establishment). According to embodiments disclosed herein, user equipment may trigger different random-access procedures, wherein one random-access procedure is energy efficient such that the preamble causes a RAN receiving the energy-efficient preamble to activate full reception capability with respect to the user equipment, and another random-access procedure may be highly reliable but not energy efficient (e.g., the RAN node does not implement DRX off with respect to one or more particular beams), wherein network-energy-inefficient random access with respect to one or more user equipment may be facilitated on an on-demand basis (e.g., upon having received an emergency access request from an idle mode user equipment device).

Embodiments disclosed herein may facilitate dynamic RAN DRX adaptation, wherein support for essential uplink radio procedures (e.g., emergency random access) is maintained regardless of DRX state at a RAN node that is implementing DRX off operation. According to embodiments disclosed herein, a RAN node may increase NES by using increased/extended DRX off periods with respect to non-emergency random access uplink resources by implementing partial DRX off periods, with reduced reception loading, by configuring user equipment to use emergency random access resources that the RAN node may monitor with respect to a group beam, or a composite beam, that corresponds to one or more uplink beams, and associated resources, that the RAN node may avoid monitoring during a DRX off period.

A user equipment may transmit uplink traffic, for example an emergency uplink access request, during an active RAN DRX off period, but may buffer non-emergency access requests, or other uplink traffic, or may forward non-emergency access requests, or other uplink traffic, to another RAN node during an active DRX off period. Accordingly, a RAN node may safely adopt longer DRX off periods while maintaining compliance with regulatory restrictions that mandate that RAN nodes are always able to receive and process potential emergency access requests from idle mode user equipment devices.

Accordingly, a RAN node may be able to facilitate receiving and processing emergency uplink access requests but with an increase in DRX off NES gain compared with conventional DRX off techniques. Embodiments disclosed herein may facilitate time and spatial adaptation of emergency random access resources and dynamic DRX off RAN node operation.

Energy-Efficient Beam-Group Random Access.

Figure 2:
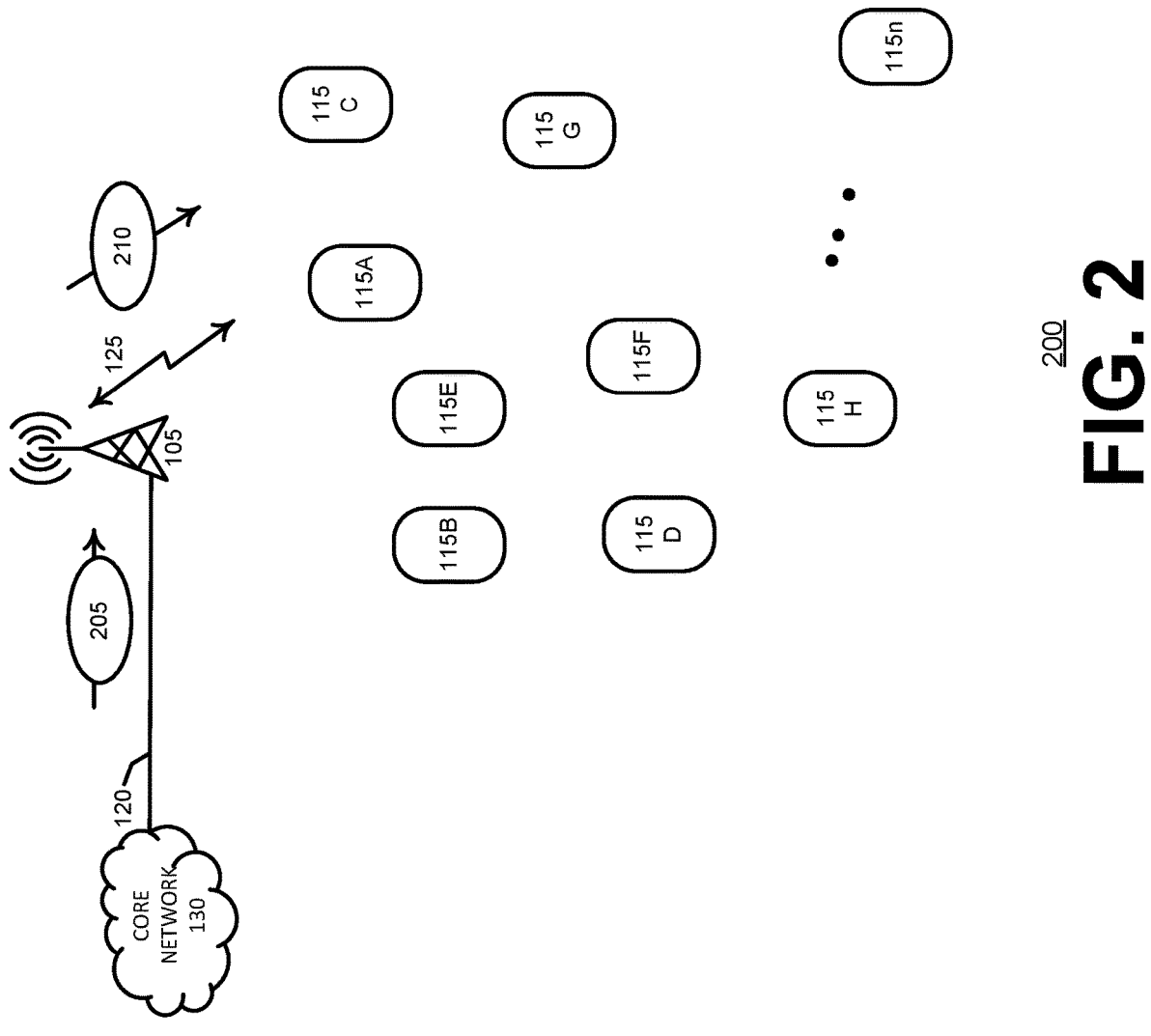
FIG. 2 illustrates an example environment with a radio network node serving at least one user equipment.

Turning now to FIG. 2, the figure illustrates environment 200 in which radio access network node 105 receives from core network 130 reduced-capability connection establishment criterion configuration 205, which may comprise at least one mode transitioning criterion. RAN 105 may transmit to one or more user equipment 115 reduced-capability connection establishment configuration 210. User equipment 115A-115n may be served by, or may be within coverage of a beam corresponding to, RAN 105.

FIG. 3 illustrates an example a reduced-capability connection establishment criterion configuration 205 that may be received from computer equipment corresponding to core network 130. A RAN node may receive a reduced-capability connection establishment criterion configuration 205 during operation, by a RAN node, of a discontinuous reception OFF period. Configuration 205 may comprise a minimum criterion threshold 305 of a number of idle-to-active transitioning devices per downlink beam usable to determine to allocate dedicated random access channel ("RACH") channel resources associated with such beam during RAN DRX off periods. Criterion 305 may be referred to as a mode transitioning criterion. Configuration 205 may comprise a time period duration criterion 310, during which a number of active devices per downlink beam is tracked by the RAN node for analysis with respect to criterion 305. Criteria 305 and 310 configured via configuration 205 may facilitate maintaining, by a RAN node receiving the criterion, a reduced minimum access performance (instead of a total deactivation of receive capability), during a DRX off period and thus facilitating receiving of uplink traffic during a DRX off period, for example, to receive uplink emergency access requests. Unlike with conventional techniques, wherein a RAN node may allocate a dedicated RACH resource set per each available downlink beam, thus requiring that the RAN node always activate reception with respect to all available beams, which can be on order of tens or hundreds of beams, using embodiments disclosed herein a RAN node may adaptively allocate a RACH resource set to a subset of downlink beams, or to a beam that is serving a largest number of camping devices. Thus, emergency access requests may be timely acted upon while facilitating deactivating, by the RAN node, some available receiver resources and thus increasing NES gain with respect to NES obtained using conventional techniques. Deactivating some, but not all, receiver resources may be referred to as partial DRX off because the RAN node may be able to receive preambles transmitted by user equipment using uplink resources that may not correspond to active downlink beams.

Figure 4:
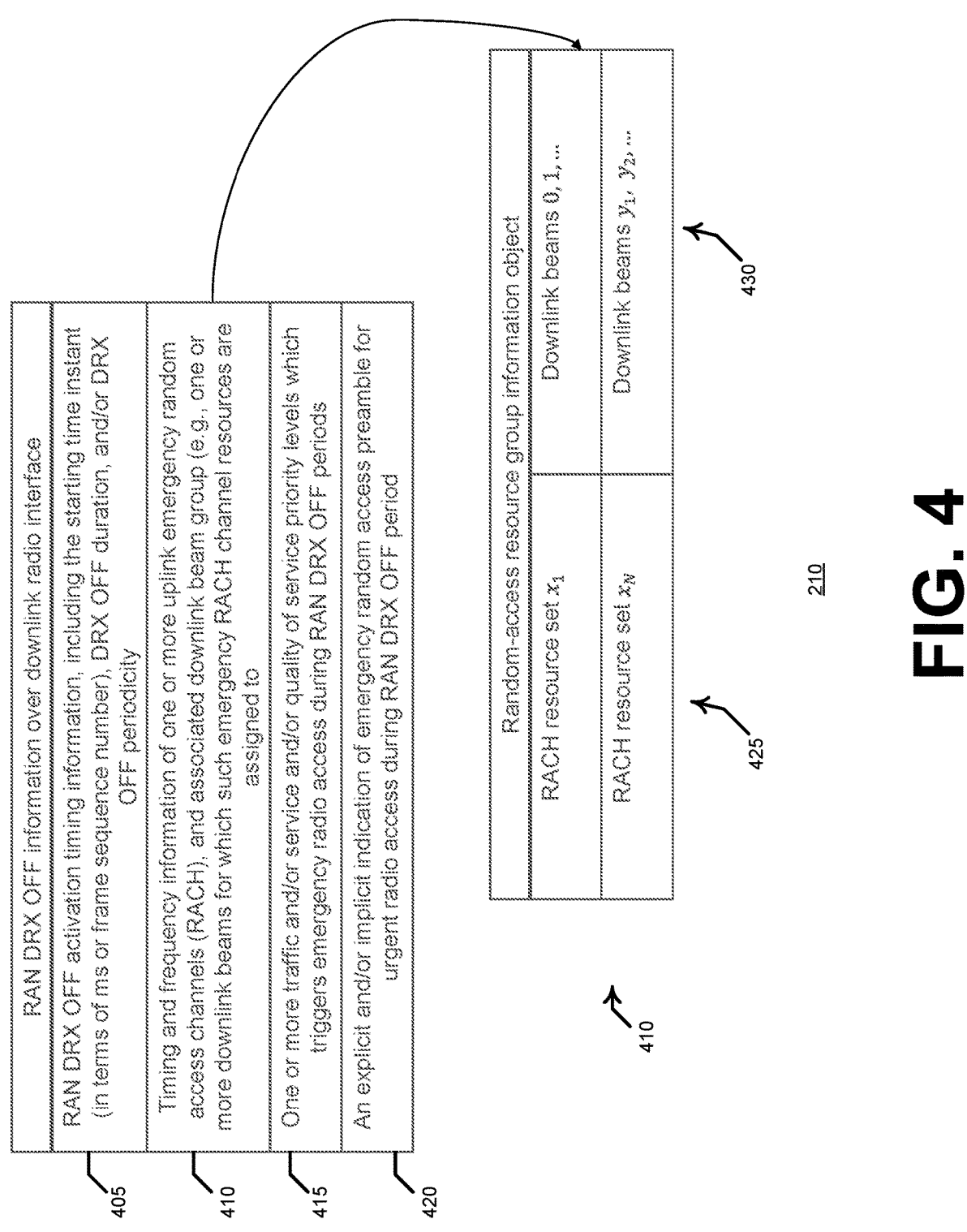
FIG. 4 illustrates an example reduced-capability connection establishment configuration.

FIG. 4 illustrates an example reduced-capability connection establishment information indication 210, which may be referred to as a reduced-capability connection establishment information configuration. Connection establishment information indicated in configuration 210 may comprise at least one of: in field 405 discontinuous receive off timing information defining at least one active discontinuous receive off period with respect to the radio network node; at least one reduced-capability priority level; in field 420 at least one reduced-capability random access preamble to be used to facilitate accessing, by the user equipment, the radio network node during active discontinuous receive off operation by the radio network node with respect to the optimal beam to transmit uplink traffic corresponding to at least one of the at least one reduced-capability priority level; in field 410 at least one reduced-capability time uplink resource indication or at least one reduced-capability frequency uplink resource indication indicative of at least one reduced-capability time uplink resource or at least one reduced-capability frequency uplink resource, respectively, usable to facilitate accessing, by the user equipment, the radio network node via at least one uplink emergency random access channel; or in field 415 one or more traffic and/or service and/or quality of service priority levels which may be used to determine to trigger emergency radio access during RAN DRX OFF periods Field 410 may comprise at least one downlink beam group indication, indicative of at least one downlink beam with respect to at least one of which the user equipment has determined is the optimal beam corresponding to the user equipment, usable to determine, by the user equipment, that the radio network node is configured to receive the at least one reduced-capability random access preamble, during active discontinuous receive off operation, corresponding to at least one of the at least one reduced-capability priority level, according to the at least one reduced-capability time resource or at least one reduced-capability frequency uplink resource.

A RAN node may transmit or broadcast a configuration 210 that comprises RAN DRX off activation timing information 405, including the starting time instant (in terms of milliseconds or a frame sequence number), DRX off duration, and/or DRX off periodicity, and/or default one or more sets of random access resource groups 410 and associated one or more downlink beams/beam group, during the RAN DRX off periods, towards idle mode devices via downlink radio interface links. Group indication 410 may be indicative that a reduced-capability/emergency access resource set is associated with a set, or group, of beams that are active during inactive DRX off periods. The reduced-capability resource indication 410 may be indicative of one or more resources that may be usable to facilitate delivery of emergency access requests during the periods a DRX off is active at a RAN node. Accordingly, emergency access requests transmitted by user equipment devices may be delivered despite the RAN node having activated DRX off operation, which may be referred to as partial DRX off operation since the RAN node is capable of receiving emergency access requests albeit with reduced capability with respect to reception capability when the RAN node is not implementing DRX off operation.

Configuration 210 may comprise an explicit and/or implicit indication 420 of at least one emergency random access preamble usable for urgent radio access during RAN DRX off period. An emergency preamble 420 may be referred to as a reduced-capability random access. Configuration 210 may comprise timing and frequency information 410 corresponding to one or more uplink emergency random access channels and an associated downlink beam group (e.g., one or more downlink beams to which such emergency RACH channel resources are assigned). Information 410 may be indicative to an idle user equipment 115 to use reduced capability uplink access information during periods when a RAN node has activated partial DRX off (and thus reception capabilities corresponding to the RAN may be reduced, but nevertheless still available, to achieve NES). A RAN node may temporarily configure user equipment devices with one or more emergency access uplink resource sets 425, indicated in field 410, where each resource set is associated with a beam group comprising multiple beams as indicated in field 430, rather than a single access resource set being associated with, or corresponding to, a single beam. Accordingly, a radio network node may only monitor emergency access uplink resources indicated in field 425 with respect to a beam direction that may be referred to as a composite beam direction and that may correspond to one or more beams indicated as corresponding to a beam group in field 430. A composite beam direction may be based on a function, for example an averaging function, applied to one or more beam vector directions that correspond to beams that make up a beam group as indicated in field 430 of configuration 210. A composite, or group, RACH resource, or composite/group RACH resources, may be indicated in field 425 as being associated with a corresponding group indicated in field 430. Configuration information 210 may be usable, by at least one idle user equipment 115, to facilitate transmission of uplink traffic to radio network node 105 during activate operation of discontinuous receive off by radio network node 105 shown in FIG. 2.

Figure 5:
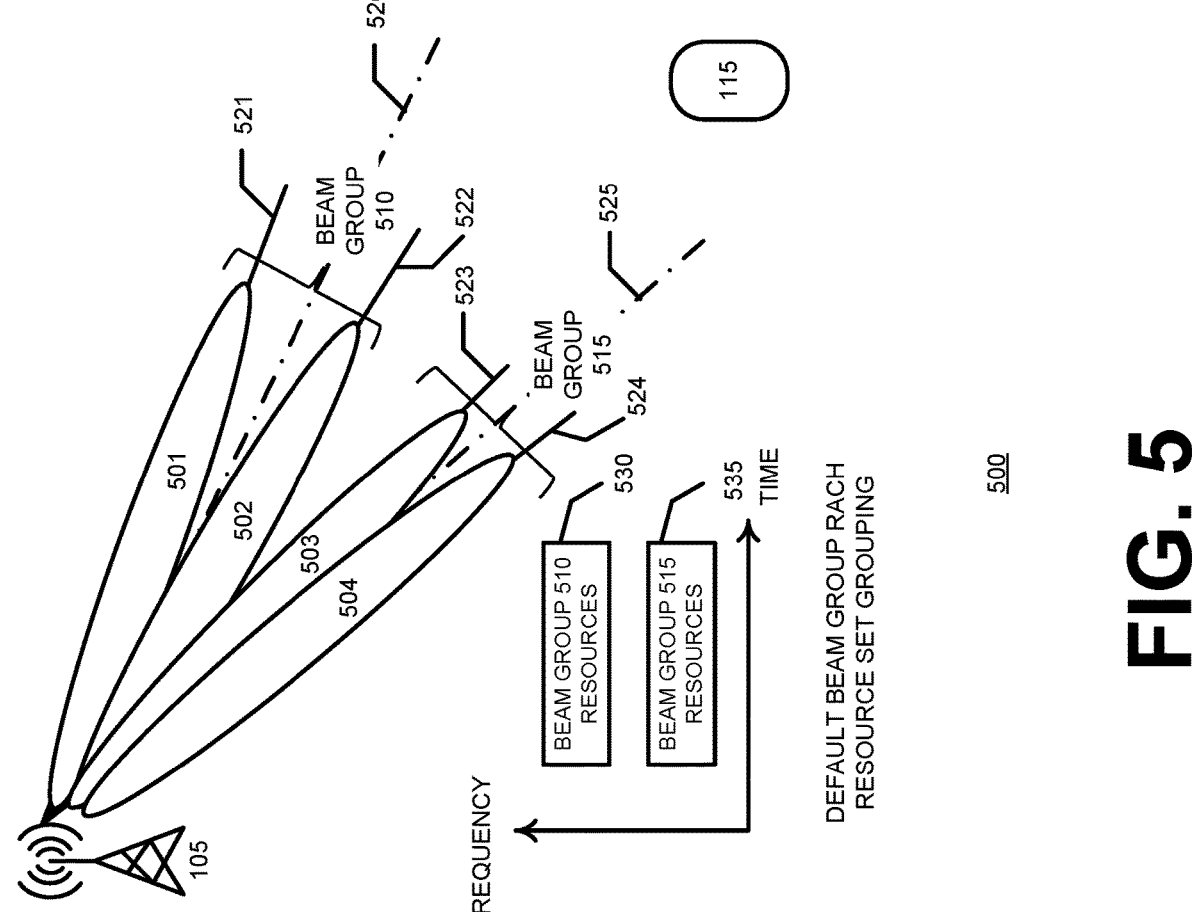
FIG. 5 illustrates an example environment with multiple beams corresponding to a radio network node that is serving multiple user equipment.

Turning now to FIG. 5, the figure illustrates an environment 500 wherein radio access network node 105 may be serving multiple user equipment via multiple beams 501-504. Beams 501-504 shown in FIG. 5 may represent downlink beams and respective corresponding downlink beam orientation directions 521-524, and may also represent uplink beams and corresponding uplink beam orientation directions which may be the same as the downlink beam orientation directions. (It will be appreciated that RAN node 105 may process signals directed to multiple transmit antennas and received from multiple receive antennas such that a given downlink beam is associated with a corresponding dispersion angle with respect to the ground and that an uplink beam receive antenna gain associated with an uplink beam corresponding to the downlink beam is a maximum along the dispersion angle corresponding to the downlink beam.)

User equipment 115 may determine one of beams 501-504 as a best beam, or as an optimal beam, based on determining a downlink signal strength with respect to one or more of the beams and deeming one of beams having a strongest signal strength value associated with a signal received from radio network node 105 as being the best/optimal beam. For example, UE 115 may determine that a signal strength corresponding to beam 503 is a best, or optimal, beam. In the example shown in FIG. 5, beams 501-504 may not have been determined to be an important beam insofar as none of the beams correspond to a number of user equipment that have attempted to transition from idle mode to connected mode that exceeds a mode transitioning criterion indicated in field 305 of configuration 205, during a time window that is indicated as a time window criterion in field 305 of configuration 205. As a default, RAN node 105 may halt, during a DRX off period indicated in field 405 of configuration 210, monitoring of resources corresponding uniquely and respectively to beams 501-504, and may instead monitor group RACH resource sets corresponding respectively, to beam group 510, which comprises beams 501 and 502 and has a composite beam direction 520), and beam group 515, which comprises beams 503 and 504 and has a composite beam direction 525. Composite beam direction 520 may be determined based on applying a function to beam direction 521 corresponding to beam 501 and beam direction 522 corresponding to beam 502. Composite beam direction 525 may be determined based on applying a function to beam direction 523 corresponding to beam 503 and beam direction 524 corresponding to beam 504. The default embodiment may be used during DRX off operation wherein none of beams 501-504 have been determined to be an important beam, as described in reference to FIG. 6.

Figure 6:
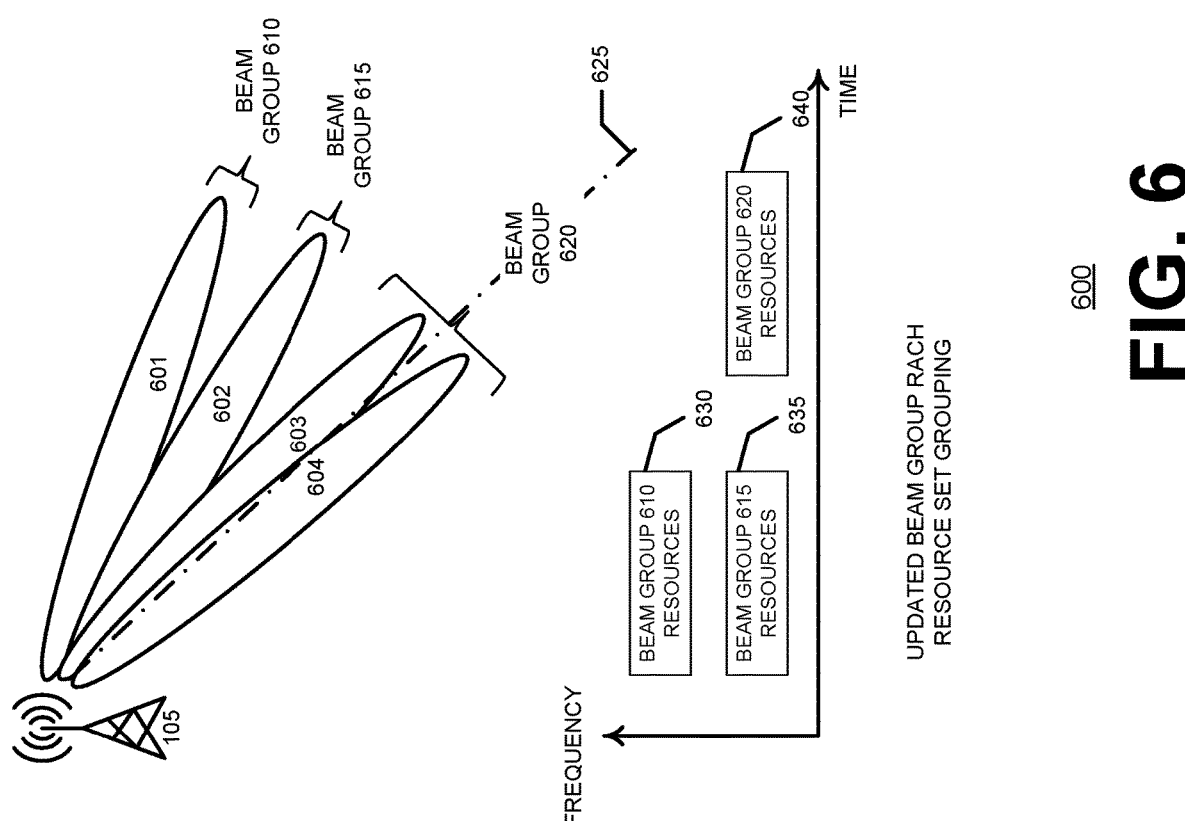
FIG. 6 illustrates an example environment with a composite beam corresponding to multiple beams of a beam group that are deactivated during discontinuous receive operation of a radio network node with respect to at least one beam of the beam group.

As shown in FIG. 6, on condition of RAN node 105 determining a number of idle-to-active transitioning user equipment 115 (e.g., user equipment 115A-115*n* shown in FIG. 1 but not shown in FIG. 6 for clarity purposes), which may have been camping on a certain downlink beam, for example beam 602, that is larger than the configured minimum threshold 305 indicated in configuration 205 during a period, or time window, indicated in field 310 of FIG. 3, RAN node 105 may update default RACH resource groups (shown in FIG. 5) by allocating a dedicated RACH resource set, for example resource set 635, to beam group 615 that solely comprises important beam 602. A beam (e.g., beam 602) determined to correspond to a number of transitioning user equipment that exceeds the criterion indicated in field 305 of configuration 205 may be deemed as an 'important' beam because a large number (e.g., exceeds a criterions indicated in field 305 of configuration 205) of user equipment have selected the node to camp on and have transitioned to a connection state from an idle state via the important beam.

RAN node 105 may allocate a dedicated RACH resource set, for example RACH resource set 640, for use with respect to a beam group that comprises more than one consecutive downlink beams 603 and 604 (excluding determined important beam 602). In addition, in the example shown in FIG. 6, beam 601 may not be determined to be an important beam, and because in the illustrated embodiment beam 601 is not adjacent to another beam that is not determined to be an important beam, beam 601 is also a sole member of a beam group (e.g., beam group 610), to which RAN node 105 may allocate PRACH resource set 630. As shown in FIG. 6, a composite beam direction/orientation/ angle (with respect to RAN node 105) may be determined by applying a function, for example an average function, to beam directions corresponding to beams 603 and 604. Thus, RAN node 105 may be configured to adaptively, with respect to time, allocate a dedicates access RACH resource, or dedicated set of resources, (e.g., at least one frequency resource or at least one time resource) for beams (e.g., important beam 602) that serve the largest number of transitioning user equipment devices during an activated DRX off period, which may be indicated to a user equipment in field 405 of configuration 210. Accordingly, during an active DRX off period a RAN node may maintain reliability of facilitating emergency service with respect to a largest number of user equipment that have determined a beam as a best beam, while allocating at least one reduced capability RACH resource to a composite beam that corresponds to a beam on which few user equipment may be camping. The at least one resource allocated to the composite beam may facilitate the RAN node maintaining emergency service with respect to the other user equipment but at a reduced access reception capability than may correspond to available downlink beams that are available during a deactivated DRX off period (e.g., fewer uplink resources may be monitored by the RAN node with respect to the composite beam direction than may be monitored with respect to a beam direction that at least one of the other user equipment may have determined to be an optimal beam). Thus, NES gains may be realized while facilitating emergency service reliability for a large number of user equipment and while facilitating less reliable, but still useful, emergency service access for user equipment that may be camped on a beam that is serving fewer user equipment than a configured criterion, such as criterion 305 shown in FIG. 3.

Figure 7:
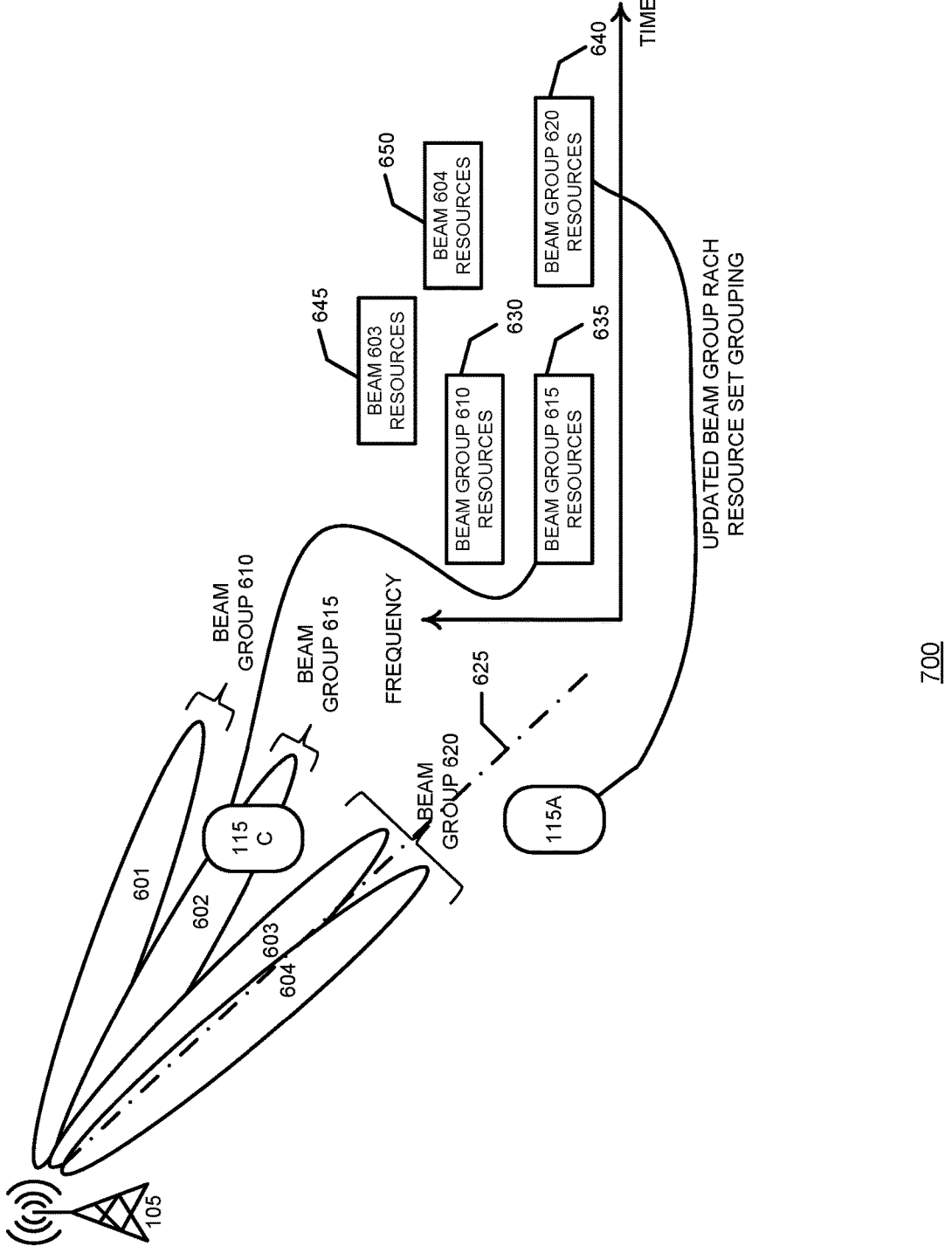
FIG. 7 illustrates an example environment during discontinuous receive operation of a radio network node with a user equipment being served by single-beam beam group and another user equipment being served by a composite beam corresponding to an optimal beam.

In an example shown in FIG. 7, user equipment 115C is shown located within coverage of beam 602 and thus uses beam resource set 635 corresponding to beam group 615, which, since beam 602 has been determined to be an important beam, may be a sole beam that makes up beam group 615. UE 115C may use a beam direction corresponding to beam 602 to transmit an uplink preamble to RAN 105 for purposes of establishing a connection with RAN 105. Because UE 115A is located where 604 is likely a best/ optimal beam with respect to UE 115A, UE may have determined 604 as an optimal beam. However, if RAN node 105 implements operation of a DRX off period indicated in field 405 of configuration 210, the RAN node may avoid monitoring resources 645 corresponding to beam 603 and resources 650 corresponding to beam 604, and instead monitor group beam resources indicated in configuration 210 field 425 as being associated in field 430 with a beam group indication that is indicative of a beam group (e.g., beam group 620) that comprises beams 603 and 604. Accordingly, UE 115A may transmit an uplink preamble, indicated in field 420 of configuration 210, via resource set 640 according to composite beam direction 625.

Turning now to FIG. 8, the figure illustrates a timing diagram of an example method 800. At act 805, RAN node 105 may receive a reduced-capability random access configuration, which may be referred to as a reduced-capability connection establishment criterion configuration, for example configuration 205 described in reference to FIG. 3. RAN node 105 may receive configuration 205 during an active RAN discontinuous reception/receive off period or during a nonactive RAN discontinuous reception/receive off period. RAN node 105 may receive configuration 205 from core network equipment via backhaul interface links. Configuration 205 may comprise: a minimum threshold/criterion of a number of idle-to-active transitioning devices per downlink beam usable to determine whether to allocate dedicated RACH channel resources to be associated with uplink transmission during RAN DRX off periods via a beam that satisfies the criterion (e.g., an 'important' beam). The transitioning threshold/criterion may be referred to as a mode transitioning criterion. Configuration 205 may comprise a rolling time period criterion during which the number of transitioning devices per downlink beam is tracked/ determined.

At act 810, RAN node 105 may transmit a reduced-capability connection establishment information configuration to UE 115 via downlink radio interface link(s) comprising: RAN DRX off activation timing information; timing and frequency resource information corresponding to at least one uplink emergency random access channel and associated at least downlink beam group indication comprising one or more downlink beams to which emergency RACH channel resource(s) is/are assigned; at least one traffic and/or service and/or quality-of-service priority level usable to determine to trigger emergency radio access during RAN DRX off periods; or indication of emergency random access preamble for urgent radio access during RAN DRX off periods. At act 815, on condition of determining a number of idle-to-active/connected transitioning user equipment that have been camping on a certain downlink beam that is larger than (e.g., satisfies) the configured mode transitioning criterion, RAN node 105 may update currently-active RACH resource groups and allocate a dedicated RACH resource group for the downlink beam (e.g., an 'important' beam) determined to have a number of UE devices transitioning to connected mode/state equal to or in excess of the mode transitioning criterion during the configured during a rolling time period corresponding to the rolling time period criterion. RAN node 105 may also allocate a dedicated RACH resource group for one or more consecutive downlink beams, except the determined 'important' beam. At act 820, RAN node 105 may transmit/broadcast updated reduced-capability random access information, which may be transmitted during active RAN DRX off periods or during nonactive RAN DRX off period. Updated reduced-capability random access information, transmitted at act 820, may comprise updated RACH resource group indications corresponding to RACH resource sets usable with respect to one or more composite beams (e.g., a beam group) during DRX off periods.

On Demand Mobile-Originated Radio Network Access.

Returning to description of FIG. 4, configuration 210 may comprise at least one indication in field 415 of one or more traffic type, service type, or Quality-of-Service that may be prioritized for triggering a user equipment to facilitate emergency radio access during a RAN DRX off period as indicated in field 405. Configuration may comprise in field 420 an explicit and/or implicit indication of at least one emergency random access preamble usable by a user equipment for urgent radio access during a RAN DRX off period indicated in field 405.

On condition of a Quality-of-Service, service type, or traffic type triggering an emergency service or emergency traffic (e.g., a user equipment is placing a 911 call in the United states or another number that may correspond to an emergency call in a different country), during an active RAN DRX off period indicated in field 410 of configuration 210, a user equipment may determine a beam, corresponding to the RAN node, that the user equipment may have previously determined to be a best beam, or optimal beam, corresponding to the user equipment. The user equipment may determine from configuration 210 an emergency RACH resource, or resource set and RACH preamble corresponding to the determined optimal beam. For example, the user equipment may determine a resource set from field 425 of configuration 210 that corresponds to a beam group that comprises the optimal downlink beam in field 430.

On condition of a determined RACH downlink beam group that solely includes the best/optimal downlink beam previously determined by the user equipment, the user equipment may select a precoding vector corresponding to the determined best downlink beam for transmission of an emergency RACH preamble indicated in field 420.

On condition of a RACH downlink beam group, determined by a user equipment to comprise a previously determined optimal beam, that includes more than one downlink beam (e.g., more than one beam that is active during a nonactive DRX off period), the user equipment may determine a precoding vector that corresponds to an average beam direction, or composite beam direction, that may be derived from beam directions corresponding to beams that make up the determined beam group (e.g., the composite beam direction may be an average of beam directions corresponding to beams indicated in a field in column 430 of configuration 210 that comprises the determined optimal beam). The user equipment may transmit an emergency preamble, indicated in field 420 of configuration 210, in a direction that corresponds to the composite beam. Due to the reduced capability uplink access of the RAN node (e.g., one set of resources may be monitored by the RAN node with respect to the composite beam direction associated with a beam group instead of the RAN node monitoring a resource set corresponding to a particular beam of the beam group in a direction that corresponds to the particular beam), user equipment may temporarily modify access transmission behavior by adopting uplink precoding encoding information that corresponds, not to the best/optimal detected beam, but instead to the average/composite beam direction associated with an emergency beam group that comprises the detected best/optimal beams belong to. The user equipment may transmit, in the uplink direction, the determined emergency preamble via the determined RACH resource corresponding to the composite beam direction using the determined uplink transmission precoding vector.

On condition of the user equipment determining a beam group comprising more than one downlink beam, the user equipment may receive and decode an on-demand system information block (e.g., a SIB1 message) to determine full-capability random-access information, which may be applicable with respect to an idle mode user equipment device, which may have determined/adopted an uplink precoding vector that does not match a precoding vector that corresponds to the determined best/optimal beam, to facilitate the user equipment establishing a connection via a beam determined to be a best/optimal beam with respect to the user equipment. Thus, according to embodiments disclosed herein, RAN nodes can safely adopt/operate DRX off periods while still being responsive to user/equipment/triggered emergency uplink access requests at any time.

Turning now to FIG. 9, the figure illustrates a timing diagram of a method 900. At act 905, UE/WTRU 115 may receive a mobile-originated emergency radio access configuration, which may be referred to as a reduced-capability connection establishment information configuration (e.g., configuration 210 described in reference to FIG. 4, from selected/serving RAN node 105 via downlink radio interface link(s) comprising: RAN DRX off activation timing information; timing and frequency resource information corresponding to at least one uplink emergency random access channel and associated at least downlink beam group indication comprising one or more downlink beams to which emergency RACH channel resource(s) is/are assigned; at least one traffic and/or service and/or quality-of-service priority level usable to determine to trigger emergency radio access during RAN DRX off periods; or indication of emergency random access preamble for urgent radio access during RAN DRX off periods. The RAN DRX off period activation timing information may comprise a starting time in terms of milliseconds or frame sequence number, DRX off period duration, or DRX off period periodicity. The emergency random access preamble may be indicated explicitly (e.g., a preamble) or implicitly (e.g., an index indicative of a preamble) and may be used to facilitate urgent radio access during a RAN DRX off period. The timing and frequency resource information corresponding to at least one uplink emergency random access channel may be associated with a downlink beam group indication indicative of at least one beam to which emergency RACH channel resource(s) is/are assigned/allocated.

On condition of triggering an emergency service or traffic that satisfies, or corresponds to a configured emergency priority level, type, or QOS during an active RAN DRX off period, UE/WTRU 115 may determine, at act 910 based on configuration information contained in configuration 210, a downlink beam group that comprises a beam that the UE/WTRU determines is a best beam (e.g., a beam having a strongest signal strength at the UE with respect to other beams corresponding to RAN node 105). At act 915, UE/WTRU 115 may determine, based on emergency access configuration information received from RAN node 105 (e.g., configuration information 210), emergency RACH resources and a RACH preamble. At act 920, on condition of determining at act 910 a RACH downlink beam group that comprises only a beam that UE/WTRU determined as a best downlink beam, UE/WTRU may select a precoding vector corresponding to the determined best downlink beam for transmission of an emergency RACH preamble. The precoding vector determined at act 920 may have already been determined or configured before DRX off operation implemented by RAN 105. On condition of a RACH downlink beam group, determined at act 910, that comprises more than one downlink beam, at act 925 UE/WTRU 115 may calculate/determine and select a precoding vector corresponding to a composite beam direction that may be determined based on applying a function, for example an average function, to beam directions associated with individual beams of the beam group determined at act 910. UE/WTRU 115 may use the precoding vector determined at act 925 for transmission of an emergency RACH preamble. At act 930, UE/WTRU 115 may transmit, in the uplink direction, a determined emergency preamble, which may be referred to as a reduced-capability random access preamble, via determined RACH resources according to a precoding vector selected at act 920 or according to a precoding vector calculated or determined at act 925. On condition of a determined current RACH downlink beam group comprising more than one downlink beam, at act 935 UE/WTRU 115 may receive and decode an on-demand system information block (e.g., a SIB1 message) broadcast by RAN 105, and may determine, based on the SIB1 message, full random access information that may be usable with respect to an individual beam (e.g., a beam determined by the UE/WTRU as a best beam) that may be activated (e.g., RAN 105 may deactivate DRX off and monitors resources configured to correspond to the individual beam). At act 940, UE/WTRU 115 may transmit a conventional uplink preamble via RACH resources, associated with the beam determined by the UE/WTRU as a best beam, toward the currently selected RAN node 105.

Turning now to FIG. 10, the figure illustrates a flow diagram of an example method 1000. Method 1000 begins at act 1005. At act 1010, a radio access network node may receive from core network equipment a reduced capability connection establishment criterion configuration, for example configuration 205 described in reference to FIG. 3. The configuration received at act 1010 may comprise a mode transitioning criterion, which may comprise a transitioning number criterion (e.g., contained in field 305 shown in FIG. 3) or a mode transition time window criterion (e.g., contained in field 310 shown in FIG. 3). The mode transition time window criterion may be indicative of an amount of time during which the radio access network node may determine a number of user equipment transitioning from an idle mode to a connected mode with respect to a particular downlink beam corresponding to the radio access network node. At act 1015, the radio access network node may determine a number of user equipment transitioning from an idle mode to a connected mode during a mode transition time window corresponding to the mode transitioning criterion with respect to a particular beam. At act 1020, the radio access network node may determine whether a number of user equipment determined to attempt transitioning from an idle mode to a connected mode with respect to a particular beam satisfies the mode transitioning criterion. If the radio network node determines at act 1020 that a number of user equipment that attempted to transition from an idle mode to a connected mode with respect to a particular beam satisfies the mode transitioning criterion configured via the configuration received at act 1010, at act 1025 the radio access network node may determine the particular beam, with respect to which the number of transitioning user equipment was determined at act 1015, to be an 'important' beam. The radio access network node may determine the particular beam to be an important beam because many user equipment may be camped on the particular beam, as indicated by the number of user equipment attempting to transition from an idle mode to a connected mode satisfying the mode transitioning criterion, and thus maintaining full access capability with respect to the particular beam may avoid reducing access capability with respect to the user equipment camped on the particular important beam. At act 1030, the radio access network node may determine whether all beams corresponding to the radio access network node have been evaluated with respect to determining a number of user equipment that may satisfy the mode transitioning criterion. If a determination is made at act 1030 that all beams corresponding to the radio access network node have not been evaluated, at act 1035 the radio access network node may increment, or advance, to a next beam (e.g., a beam adjacent to a current beam being evaluated with respect to orientation in space) to evaluate and method 1000 may return to act 1015 and determine a number of transitioning user equipment with respect to the next beam. Returning to description of act 1020, if the radio access network node determines that a transitioning number of user equipment determined at act 1015 does not satisfy a mode transitioning criterion configured via the configuration received at act 1010, method 1000 may advance to act 1030.

At act 1030, if the user equipment determines that all beams have been evaluated to determine whether the beams are important, at act 1040 the radio access network node may transmit, or broadcast, a reduced capability connection establishment information configuration (e.g., configuration information 210 described in reference to FIG. 4). At act 1045, the radio access network node may determine to implement a DRX off period to reduce energy consumption at the radio access network node. It will be appreciated that in an embodiment the configuration transmitted/broadcast at act 1040 may be transmitted/broadcast by the radio access network node after the radio access network node implements a DRX off period at act 1045.

At act 1050, a user equipment operating in an idle mode that is camped on a beam corresponding to the radio access network node may determine to transmit an uplink preamble to the radio access network node to indicate to the radio access network node that the idle user equipment is requesting service with respect to the radio access network node (e.g., the preamble is to be indicative that the user equipment is requested to connect to the radio access network node). At act 1055, the user equipment may determine whether the service to be requested by transmitting a preamble to the radio access network node corresponds to an emergency service, a priority level, a quality of service, or some other preferred surface that may be indicated in field 415 of configuration information 210 shown in FIG. 4 that may be transmitted at act 1040. If the user equipment determines at act 1055 that a service to be requested by a preamble transmitted to the radio access network node during a DRX off period implemented by the radio access network node does not satisfy, match, or correspond to a service indicated in field 415 of configuration information 210, the user equipment may determine not to transmit an uplink pre-amble because the radio access network node is implement-ing a DRX off period. Accordingly, the user equipment may buffer a preamble, or uplink traffic corresponding to the service to be requested, until the radio access network node deactivates the energy-saving DRX off period, which may be indicated in field 405 of configuration 210, and method 1000 may advance to act 1090 and end.

Returning to description of act 1055, if the user equipment determines that, upon evaluation of a service to be requested from the radio access network node, the service satisfies a service type, quality of service, or other criterion indicated in field 415 of configuration 210, at act 1060 the user equipment may determine a beam group, indicated in field 430 of configuration 210, that comprises a beam correspond-ing to the radio access network node that the user equipment has determined to be a best/optimal beam, which, for example, may be determined based on signal strength. The user equipment may determine a random-access channel resource set from field 425 that corresponds to the beam group in a field 430 that comprises the best/optimal beam as determined by the user equipment. The random-access chan-nel resource set indicated in the determined field 425 may comprise a composite beam direction that may be derived by applying a function to one or more beams indicated as being part of the beam group that comprises the best/optimal beam. In an embodiment, the user equipment may determine a composite beam direction by applying a function to one or more beams indicated as being part of the beam group that comprises the best/optimal beam.

At act 1065, the user equipment may determine whether a beam group determined at act 1060 comprises only the best/optimal beam. If the user equipment determines that the beam group determined at act 1060 comprises only the best/optimal beam or only a single beam, which may not be the best/optimal beam, the user equipment may select at act 1070 a random access channel precoding vector correspond-ing to the best/optimal beam or corresponding to the other single beam, which precoding vector may have already been configured to the user equipment. If the user equipment determines that the beam group determined at act 1060 comprises more that one beam, the user equipment may, at act 1075, calculate, or determine, a precoding vector that corresponds to a composite beam that is based on the beams that the beam group determined at act 1060 comprises. At act 1080, the user equipment may transmit to the radio access network node an emergency preamble, corresponding to the determination made at act 1050, that may be indicated in field 420 of configuration 210. The user equipment may transmit the preamble at act 1080 according to a random-access channel precoding vector determined at either act 1070 or act 1075. The user equipment may transmit the preamble at act 1080 according to a composite beam direc-tion that corresponds to a direction derived by applying a function, for example an average function, to beam direc-tions corresponding to beams that the beam group deter-mined at act 1060 comprises. Because a composite beam direction corresponding to multiple beams of a beam group determined at act 1060 may not be aligned with any individual beam of the beam group, transmission at act 1080 of a preamble to obtain access to the radio access network node may be referred to as reduced-capability access preamble because the radio access network node may have reception capability tuned according to the composite beam direction instead of a beam direction corresponding to a beam that the user equipment seeking to connect to the radio access network node has determined to be a best/optimal beam. A random-access channel preamble, indicated in field 420 of configuration 210, that the user equipment may have deter-mined to use may be a more conservative preamble than a preamble that may have been previously configured to be used by the user equipment to obtain access with the radio access network node according to a best/optimal being determined by the user equipment. For example, a preamble indicated in field 420 of configuration 210 may be longer (e.g., comprise more bits) than a preamble that the user equipment may be configured to use to access the radio access network node according to the best/optimal beam.

In an embodiment, if the user equipment determines a beam group at act 1060 that comprises multiple beams, and thus uplink transmission of a random access channel pre-amble will likely be transmitted, during a DRX off period implemented by the radio access network node, according to a composite beam direction instead of according to a beam direction corresponding a beam that the user equipment has determined as a best/optimal beam, the user equipment may, at act 1085, wait to receive a SIB1 message and establish a connection with the radio access network node based on information contained in the system information block 1 (SIB1) message (e.g., conventional connection establish-ment), thus reducing a number of preamble transmission (e.g., one transmission instead of two) if the user equipment determines that transmission according to the composite direction may not result in successfully accessing the radio access network node. A connection established based on information received in the SIB1 message may facilitate transmitting a preamble according to a best/optimal beam determined by the user equipment according to a previously-configured (e.g., before steps of method 1000 are performed) precoding vector, beam direction, or random access channel preamble corresponding to the best/optimal beam instead of transmitting an emergency preamble according to a com-posite beam direction if the best/optimal beam is one of multiple beams that a beam group determined at act 1060 comprises. In an embodiment, the radio access network node may transmit a SIB1 message responsive to receiving an emergency preamble from the user equipment according to resources corresponding to resources indicated in configu-ration 210 or according to a composite beam direction corresponding to a beam group indicated in configuration 210.

If the best/optimal beam is the only beam of a beam group (e.g., the best/optimal beam determined by the user equip-ment is a sole beam of a beam group indicated in configu-ration 210), then transmission of an emergency preamble determined from configuration 210 would not be transmitted with reduced capability because the emergency preamble would be transmitted according to resources and a beam direction, corresponding to the best/optimal beam, with respect to which the radio access network node has not halted monitoring because the best/optimal beam is the sole beam in the beam group. Block 1085 is rendered in dashed lines in FIG. 10 to indicate that performance of act 1085 may be optional and that network energy-saving improvement while maintaining reduced-capability access with respect to idle user equipment does not depend on performance of act 1085. Transmission of an emergency preamble according to resources indicated in configuration as corresponding to a beam group that comprises multiple beams and according to a composite beam direction that corresponds to beams that the beam group comprises may trigger the radio access network node to interrupt a DRX off period, at least with respect to the beast/optimal beam corresponding to the user equipment, and broadcast a SIB1 message indicative of information usable by the user equipment to transmit a random access preamble according to resources corresponding to the best/optimal beam. After performance of act 1080 or act 1085, method 1000 may advance to act 1090 and end.

Turning now to FIG. 11, the figure illustrates an example embodiment method 1100 comprising at block 1105 facilitating, by a radio network node comprising at least one processor, receiving, from network equipment, a reduced-capability connection establishment criterion configuration, comprising at least one mode transitioning criterion; at block 1110 with respect to at least one first beam corresponding to the radio network node, determining, by the radio network node, a first number of user equipment transitioning to a connected mode with respect to the radio network node to result in a determined first transitioning number; at block 1115 analyzing, by the radio network node, the determined first transitioning number with respect to the at least one mode transitioning criterion to result in an analyzed determined first transitioning number; at block 1120 based on the analyzed determined first transitioning number failing to satisfy the at least one mode transitioning criterion, determining, by the radio network node, reduced-capability connection establishment information to be associated with, during a discontinuous receive off period to be enabled at least in part by the radio network node, a beam group that comprises the at least one first beam and a second beam; and at block broadcasting, by the radio network node, a reduced-capability connection establishment information indication indicative of the reduced-capability connection establishment information usable, by at least one idle user equipment, to facilitate transmission of uplink traffic to the radio network node during the discontinuous receive off period.

Turning now to FIG. 12, the figure illustrates a radio access network node 1200, comprising at block 1205 at least one processor configured to process executable instructions that, when executed by the at least one processor, facilitate performance of operations, comprising receiving, from core network equipment that is part of a core network, a reduced-capability connection establishment criterion configuration, comprising a mode transitioning criterion; at block 1210 with respect to at least one first downlink beam of at least one downlink beam corresponding to the radio network node, determining a first number of user equipment transitioning to a connected mode with respect to the radio network node to result in a determined first transitioning number; at block 1215 analyzing the determined first transitioning number with respect to the mode transitioning criterion to result in an analyzed determined first transitioning number; at block 1220 based on the analyzed determined first transitioning number failing to satisfy the mode transitioning criterion, allocating at least one uplink resource to be associated with a group of downlink beams that comprises the first at least one downlink beam, corresponding to a first beam direction, and a second downlink beam of the at least one downlink beam, corresponding to a second beam direction, to result in an at least one allocated group uplink resource; at block 1225 broadcasting a reduced-capability connection establishment information indication indicative of the at least one allocated group uplink resource and group random-access information usable to transmit uplink emergency traffic to the radio network node, during a discontinuous receive off period enabled at least in part by the radio network node, by user equipment that have determined the at least one first downlink beam or the second downlink beam as being an optimal downlink beam; at block 1230 monitoring, during the discontinuous receive off period, the allocated at least one uplink resource with respect to a composite beam direction; and at block 1235 avoiding, during the discontinuous receive off period, monitoring uplink resources with respect to the first beam direction and the second beam direction.

Turning now to FIG. 13 the figure illustrates a non-transitory machine-readable medium 1300 comprising at block 1305 executable instructions that, when executed by at least one processor of a radio network node, facilitate performance of operations, comprising receiving, from a core network device, a reduced-capability connection establishment criterion configuration, comprising a mode transitioning criterion; at block 1310 with respect to a first downlink beam corresponding to the radio network node, determining a first number of user equipment transitioning to a connected mode with respect to the radio network node to result in a determined first transitioning number; at block 1315 analyzing the determined first transitioning number with respect to the mode transitioning criterion to result in an analyzed determined first transitioning number; at block 1320 based on the analyzed determined first transitioning number failing to satisfy the mode transitioning criterion, allocating at least one group uplink resource to be associated with a group of beam pairs that comprises a first beam pair corresponding to the first downlink beam and corresponding to a first beam direction, and a second beam pair, corresponding to the radio network node and corresponding to a second beam direction, to result in an at least one allocated group uplink resource; at block 1325 determining, according to a function with respect to at least the first beam pair and the second beam pair, a composite uplink beam direction; at block 1330 broadcasting a reduced-capability connection establishment information indication indicative of the at least one allocated group uplink resource usable to transmit emergency uplink traffic to the radio network node, during a discontinuous receive off period to be enabled at least in part by the radio network node, by user equipment that have determined the first downlink beam or a second downlink beam of the second beam pair as being an optimal downlink beam; at block 1335 enabling, at least in part, a discontinuous receive off period, at least with respect to the first downlink beam and the second downlink beam, to result in an enabled discontinuous receive off period; at block 1340 receiving, via the at least one allocated group uplink resource according to the composite uplink beam direction during the enabled discontinuous receive off period from an idle user equipment that has determined a first downlink beam or a second downlink beam, corresponding to the first beam pair or the second beam pair, respectively, as being an optimal downlink beam, an uplink preamble; and at block 1345 based on the receiving of the uplink preamble, establishing a connection with the idle user equipment.

Turning now to FIG. 14, the figure illustrates an example embodiment method 1400 comprising, at block 1405, based on at least one signal strength corresponding to at least one downlink signal received via at least one downlink beam from a radio network node, determining, by at least one user equipment comprising at least one processor, an optimal downlink beam of the at least one downlink beam to result in a determined optimal downlink beam; at block 1410 receiving, by the at least one user equipment, a reduced-capability connection establishment configuration comprising reduced-capability connection establishment information usable, by the at least one user equipment, to facilitate transmission of uplink traffic, corresponding to at least one configured reduced-capability priority level, to the radio network node during active discontinuous receive off operation of the radio network node with respect to the determined optimal downlink beam; at block 1415 determining, by the at least one user equipment, to transmit uplink traffic corresponding to the at least one configured reduced-capability priority level during an active discontinuous receive off period facilitated by the radio network node to result in determined uplink traffic; and at block 1420 transmitting, by the at least one user equipment to the radio network node during the active discontinuous receive off period based on the reduced-capability connection establishment information, the determined uplink traffic.

Turning now to FIG. 15, the figure illustrates an example user equipment 1500, comprising at block 1505 at least one processor configured to process executable instructions that, when executed by the at least one processor, facilitate performance of operations, comprising determining an optimal downlink beam of at least one downlink beam corresponding to a radio network node based on a selection criterion to result in a determined first downlink beam; at block 1510 receiving a reduced-capability connection establishment configuration comprising reduced-capability connection establishment information usable, by the user equipment, to facilitate transmission of uplink traffic, corresponding to at least one configured reduced-capability priority level, to the radio network node during active discontinuous receive off operation of the radio network node with respect to the determined first downlink beam; at block 1515 determining to transmit uplink traffic corresponding to the at least one configured reduced-capability priority level during an active discontinuous receive off period facilitated by the radio network node to result in determined uplink traffic; at block 1520 transmitting, to the radio network node during the active discontinuous receive off period based on the reduced-capability connection establishment information comprising at least one beam group indication indicative of the determined first downlink beam and at least a second downlink beam; at block 1525 applying a function to first beam information corresponding to the determined first downlink beam and at least second beam information corresponding to at least the second downlink beam to result in composite beam information corresponding to a composite beam; and at block 1530 wherein the transmitting of the determined uplink traffic comprises transmitting the determined uplink traffic according to the composite beam information.

Turning now to FIG. 16, the figure illustrates a non-transitory machine-readable medium 1600 comprising at block 1605 executable instructions that, when executed by at least one processor of a user equipment, facilitate performance of operations, comprising determining an optimal downlink beam of at least one downlink beam corresponding to a radio network node according to a performance metric to result in a determined first downlink beam; at block 1610 receiving a reduced-capability connection establishment configuration comprising reduced-capability connection establishment information usable, by the user equipment, to facilitate transmission of uplink traffic, corresponding to at least one configured reduced-capability priority level, to the radio network node during active partial discontinuous receive off operation of the radio network node with respect to the determined first downlink beam; at block 1615 determining to transmit uplink traffic corresponding to the at least one configured reduced-capability priority level during an active partial discontinuous receive off period facilitated by the radio network node to result in determined uplink traffic; at block 1620 based on the reduced-capability connection establishment information being determined to comprise at least one beam group indication indicative of the determined first downlink beam and at least a second downlink beam, applying a function to first beam information corresponding to the determined first downlink beam and at least second beam information corresponding to at least the second downlink beam to result in composite beam information corresponding to a determined composite beam; and at block 1625 transmitting, to the radio network node during the active partial discontinuous receive off period, the determined uplink traffic according to the composite beam information.

Figure 17:
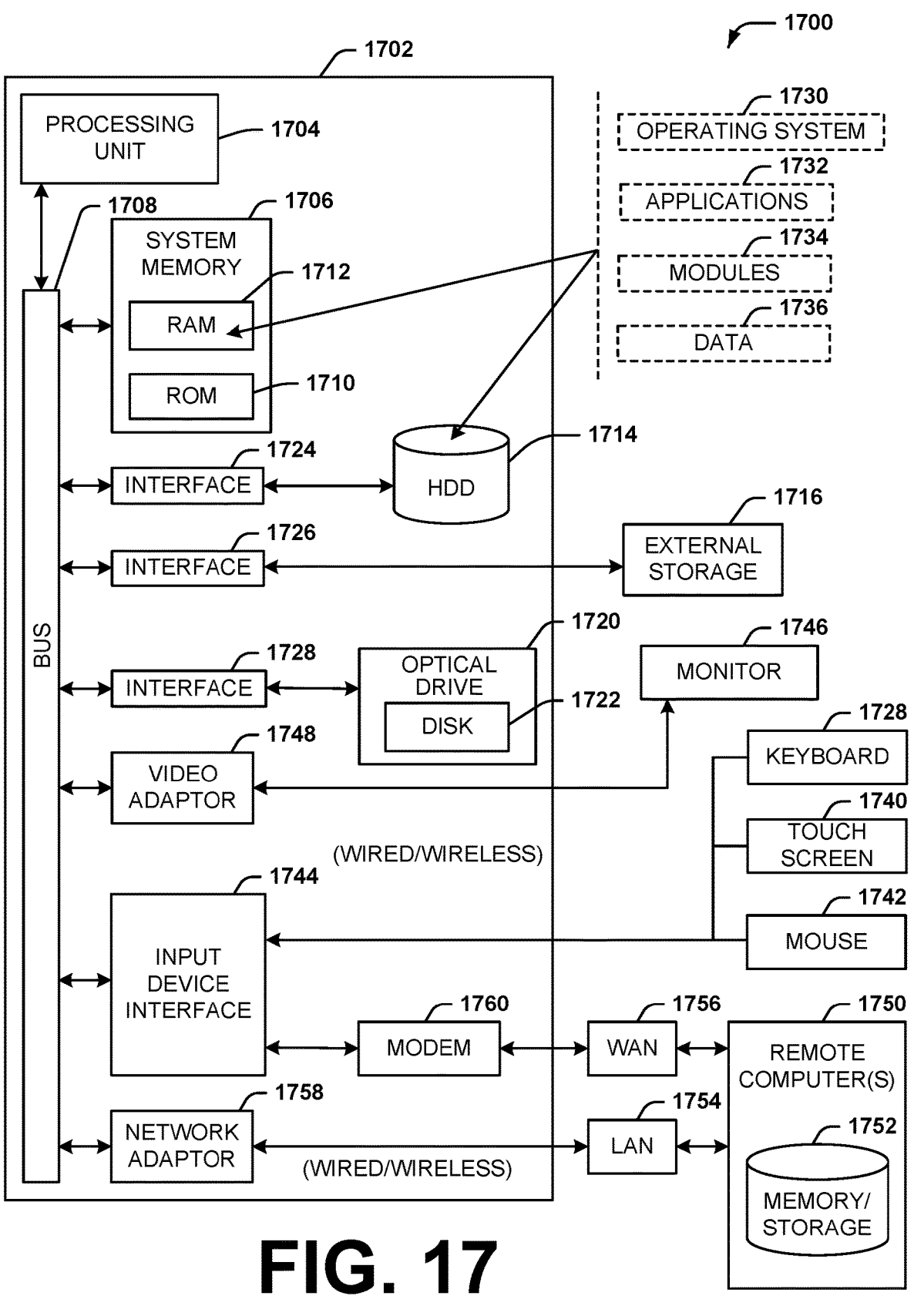
FIG. 17 illustrates an example computer environment.

In order to provide additional context for various embodiments described herein, FIG. 17 and the following discussion are intended to provide a brief, general description of a suitable computing environment 1700 in which various embodiments of the embodiment described herein can be implemented. While embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, IoT devices, distributed computing systems, as well as personal computers, hand-held computing devices, microprocessor-based or programmable consumer electronics, and the like, each of which can be operatively coupled to one or more associated devices.

The embodiments illustrated herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 17, the example environment 1700 for implementing various embodiments of the aspects described herein includes a computer 1702, the computer 1702 including a processing unit 1704, a system memory 1706 and a system bus 1708. The system bus 1708 couples system components including, but not limited to, the system memory 1706 to the processing unit 1704. The processing unit 1704 can be any of various commercially available processors and may include a cache memory. Dual microprocessors and other multi-processor architectures can also be employed as the processing unit 1704.

The system bus 1708 can be any of several types of bus structure that can further interconnect to a memory bus (with or without a memory controller), a peripheral bus, and a local bus using any of a variety of commercially available bus architectures. The system memory 1706 includes ROM 1710 and RAM 1712. A basic input/output system (BIOS) can be stored in a non-volatile memory such as ROM, erasable programmable read only memory (EPROM), EEPROM, which BIOS contains the basic routines that help to transfer information between elements within the computer 1702, such as during startup. The RAM 1712 can also include a high-speed RAM such as static RAM for caching data.

Computer 1702 further includes an internal hard disk drive (HDD) 1714 (e.g., EIDE, SATA), one or more external storage devices 1716 (e.g., a magnetic floppy disk drive (FDD) 1716, a memory stick or flash drive reader, a memory card reader, etc.) and an optical disk drive 1720 (e.g., which can read or write from a CD-ROM disc, a DVD, a BD, etc.). While the internal HDD 1714 is illustrated as located within the computer 1702, the internal HDD 1714 can also be configured for external use in a suitable chassis (not shown). Additionally, while not shown in environment 1700, a solid-state drive (SSD) could be used in addition to, or in place of, an HDD 1714. The HDD 1714, external storage device(s) 1716 and optical disk drive 1720 can be connected to the system bus 1708 by an HDD interface 1724, an external storage interface 1726 and an optical drive interface 1728, respectively. The interface 1724 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1702, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1712, including an operating system 1730, one or more application programs 1732, other program modules 1734 and program data 1736. All or portions of the operating system, applications, modules, and/or data can also be cached in the RAM 1712. The systems and methods described herein can be implemented utilizing various commercially available operating systems or combinations of operating systems.

Computer 1702 can optionally comprise emulation technologies. For example, a hypervisor (not shown) or other intermediary can emulate a hardware environment for operating system 1730, and the emulated hardware can optionally be different from the hardware illustrated in FIG. 17. In such an embodiment, operating system 1730 can comprise one virtual machine (VM) of multiple VMs hosted at computer 1702. Furthermore, operating system 1730 can provide runtime environments, such as the Java runtime environment or the .NET framework, for applications 1732. Runtime environments are consistent execution environments that allow applications 1732 to run on any operating system that includes the runtime environment. Similarly, operating system 1730 can support containers, and applications 1732 can be in the form of containers, which are lightweight, standalone, executable packages of software that include, e.g., code, runtime, system tools, system libraries and settings for an application.

Further, computer 1702 can comprise a security module, such as a trusted processing module (TPM). For instance, with a TPM, boot components hash next in time boot components, and wait for a match of results to secured values, before loading a next boot component. This process can take place at any layer in the code execution stack of computer 1702, e.g., applied at the application execution level or at the operating system (OS) kernel level, thereby enabling security at any level of code execution.

A user can enter commands and information into the computer 1702 through one or more wired/wireless input devices, e.g., a keyboard 1738, a touch screen 1740, and a pointing device, such as a mouse 1742. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1704 through an input device interface 1744 that can be coupled to the system bus 1708, but can be connected by other interfaces, such as a parallel port, an IEEE 1394 serial port, a game port, a USB port, an IR interface, a BLUETOOTH® interface, etc.

A monitor 1746 or other type of display device can be also connected to the system bus 1708 via an interface, such as a video adapter 1748. In addition to the monitor 1746, a computer typically includes other peripheral output devices (not shown), such as speakers, printers, etc.

The computer 1702 can operate in a networked environment using logical connections via wired and/or wireless communications to one or more remote computers, such as a remote computer(s) 1750. The remote computer(s) 1750 can be a workstation, a server computer, a router, a personal computer, portable computer, microprocessor-based entertainment appliance, a peer device or other common network node, and typically includes many or all of the elements described relative to the computer 1702, although, for purposes of brevity, only a memory/storage device 1752 is illustrated. The logical connections depicted include wired/ wireless connectivity to a local area network (LAN) 1754 and/or larger networks, e.g., a wide area network (WAN) 1756. Such LAN and WAN networking environments are commonplace in offices and companies, and facilitate enterprise-wide computer networks, such as intranets, all of which can connect to a global communications network, e.g., the internet.

When used in a LAN networking environment, the computer 1702 can be connected to the local network 1754 through a wired and/or wireless communication network interface or adapter 1758. The adapter 1758 can facilitate wired or wireless communication to the LAN 1754, which can also include a wireless access point (AP) disposed thereon for communicating with the adapter 1758 in a wireless mode.

When used in a WAN networking environment, the computer 1702 can include a modem 1760 or can be connected to a communications server on the WAN 1756 via other means for establishing communications over the WAN 1756, such as by way of the internet. The modem 1760, which can be internal or external and a wired or wireless device, can be connected to the system bus 1708 via the input device interface 1744. In a networked environment, program modules depicted relative to the computer 1702 or portions thereof, can be stored in the remote memory/ storage device 1752. It will be appreciated that the network connections shown are example and other means of establishing a communications link between the computers can be used.

When used in either a LAN or WAN networking environment, the computer 1702 can access cloud storage systems or other network-based storage systems in addition to, or in place of, external storage devices 1716 as described above. Generally, a connection between the computer 1702 and a cloud storage system can be established over a LAN 1754 or WAN 1756 e.g., by the adapter 1758 or modem 1760, respectively. Upon connecting the computer 1702 to an associated cloud storage system, the external storage interface 1726 can, with the aid of the adapter 1758 and/or modem 1760, manage storage provided by the cloud storage system as it would other types of external storage. For instance, the external storage interface 1726 can be configured to provide access to cloud storage sources as if those sources were physically connected to the computer 1702.

The computer 1702 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 18:
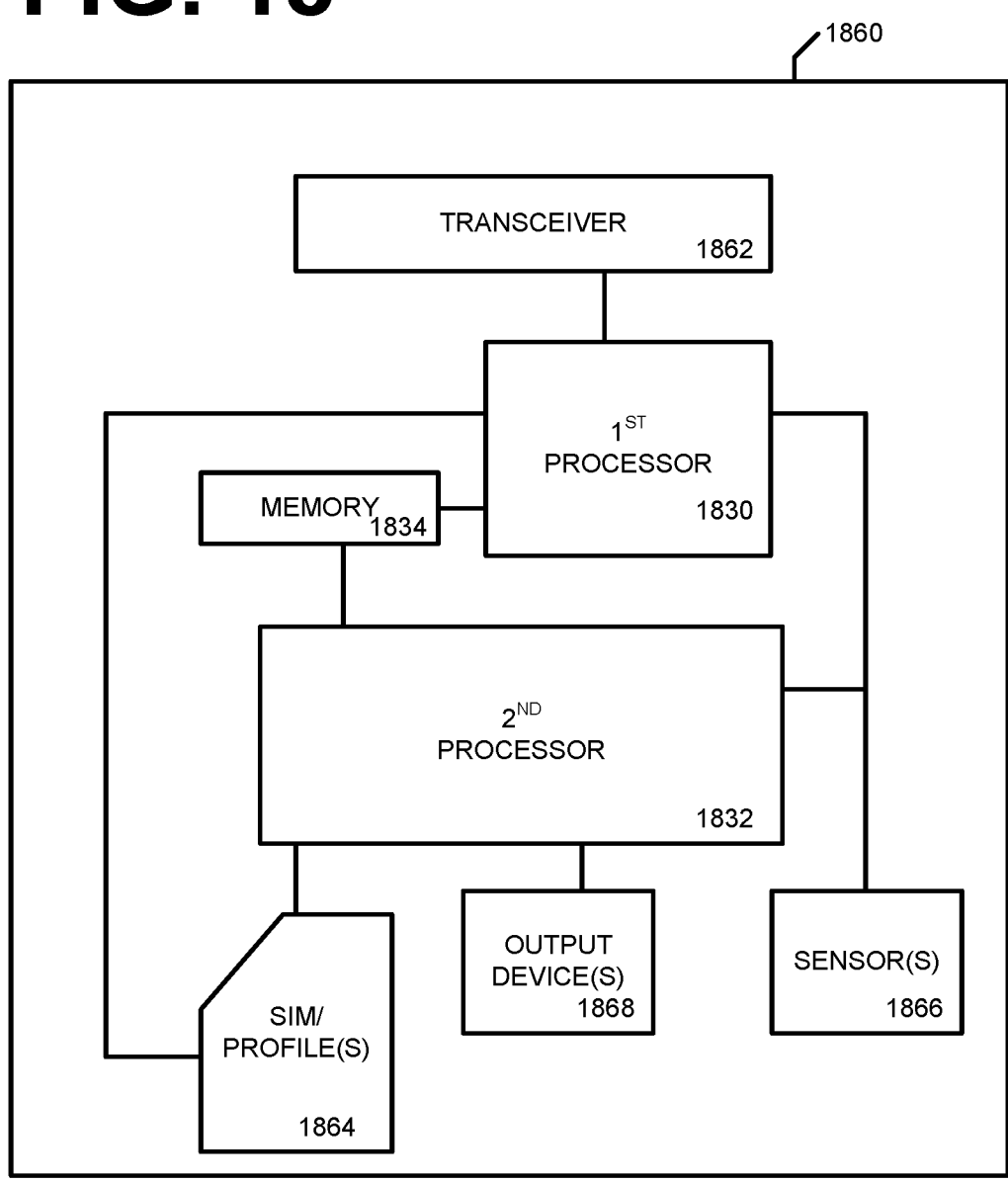
FIG. 18 illustrates a block diagram of an example wireless UE.

Turning to FIG. 18, the figure illustrates a block diagram of an example UE 1860. UE 1860 may comprise a smart phone, a wireless tablet, a laptop computer with wireless capability, a wearable device, a machine device that may facilitate vehicle telematics, a tracking device, remote sensing devices, and the like. UE 1860 comprises a first processor 1830, a second processor 1832, and a shared memory 1834. UE 1860 includes radio front end circuitry 1862, which may be referred to herein as a transceiver, but is understood to typically include transceiver circuitry, separate filters, and separate antennas for facilitating transmission and receiving of signals over a wireless link, such as one or more wireless links 125, 135, and 137 shown in FIG. 1. Furthermore, transceiver 1862 may comprise multiple sets of circuitry or may be tunable to accommodate different frequency ranges, different modulations schemes, or different communication protocols, to facilitate long-range wireless links such as links, device-to-device links, such as links 135, and short-range wireless links, such as links 137.

Continuing with description of FIG. 18, UE 1860 may also include a SIM 1864, or a SIM profile, which may comprise information stored in a memory (memory 1834 or a separate memory portion), for facilitating wireless communication with RAN 105 or core network 130 shown in FIG. 1. FIG. 18 shows SIM 1864 as a single component in the shape of a conventional SIM card, but it will be appreciated that SIM 1864 may represent multiple SIM cards, multiple SIM profiles, or multiple eSIMs, some or all of which may be implemented in hardware or software. It will be appreciated that a SIM profile may comprise information such as security credentials (e.g., encryption keys, values that may be used to generate encryption keys, or shared values that are shared between SIM 1864 and another device, which may be a component of RAN 105 or core network 130 shown in FIG. 1). A SIM profile 1864 may also comprise identifying information that is unique to the SIM, or SIM profile, such as, for example, an International Mobile Subscriber Identity ("IMSI") or information that may make up an IMSI.

SIM 1864 is shown coupled to both the first processor portion 1830 and the second processor portion 1832. Such an implementation may provide an advantage that first processor portion 1830 may not need to request or receive information or data from SIM 1864 that second processor 1832 may request, thus eliminating the use of the first processor acting as a 'go-between' when the second processor uses information from the SIM in performing its functions and in executing applications. First processor 1830, which may be a modem processor or a baseband processor, is shown smaller than processor 1832, which may be a more sophisticated application processor, to visually indicate the relative levels of sophistication (i.e., processing capability and performance) and corresponding relative levels of operating power consumption levels between the two processor portions. Keeping the second processor portion 1832 asleep/ inactive/in a low power state when UE 1860 does not need it for executing applications and processing data related to an application provides an advantage of reducing power consumption when the UE only needs to use the first processor portion 1830 while in listening mode for monitoring routine configured bearer management and mobility management/maintenance procedures, or for monitoring search spaces that the UE has been configured to monitor while the second processor portion remains inactive/asleep.

UE 1860 may also include sensors 1866, such as, for example, temperature sensors, accelerometers, gyroscopes, barometers, moisture sensors, and the like that may provide signals to the first processor 1830 or second processor 1832. Output devices 1868 may comprise, for example, one or more visual displays (e.g., computer monitors, VR appliances, and the like), acoustic transducers, such as speakers or microphones, vibration components, and the like. Output devices 1868 may comprise software that interfaces with output devices, for example, visual displays, speakers, microphones, touch sensation devices, smell or taste devices, and the like, that are external to UE 1860.

The following glossary of terms given in Table 1 may apply to one or more descriptions of embodiments disclosed herein.

TABLE 1

| Term | Definition |
| --- | --- |
| UE | User equipment |
| WTRU | Wireless transmit receive unit |
| RAN | Radio access network |
| QoS | Quality of service |
| EPI | Early paging indication |
| DCI | Downlink control information |
| SSB | Synchronization signal block |
| RS | Reference signal |
| PDCCH | Physical downlink control channel |
| PDSCH | Physical downlink shared channel |
| MUSIM | Multi-SIM UE |
| SIB | System information block |
| MIB | Master information block |
| eMBB | Enhanced mobile broadband |
| URLLC | Ultra reliable and low latency communications |
| mMTC | Massive machine type communications |
| XR | Anything-reality |
| VR | Virtual reality |
| AR | Augmented reality |
| MR | Mixed reality |
| DCI | Downlink control information |
| DMRS | Demodulation reference signals |
| QPSK | Quadrature Phase Shift Keying |
| WUS | Wake up signal |
| HARQ | Hybrid automatic repeat request |
| RRC | Radio resource control |
| C-RNTI | Connected mode radio network temporary identifier |
| CRC | Cyclic redundancy check |
| MIMO | Multi input multi output |
| AI | Artificial intelligence |
| ML | Machine learning |
| QCI | QoS Class Identifiers |
| BSR | Buffer status report |
| SBFD | Sub-band full duplex |
| CLI | Cross link interference |
| TDD | Time division duplexing |
| FDD | Frequency division duplexing |
| AI | Artificial intelligence |
| ML | Machine learning |
| MCS | Modulation and coding scheme |
| IE | Information element |
| BS | Base station |
| RRC | Radio resource control |
| UCI | Uplink control information |
| UE | User equipment |
| WTRU | Wireless transmit receive unit |
| CBR | Channel busy ratio |
| SCI | Sidelink control information |

TABLE 1-continued

| Term | Definition |
| --- | --- |
| QoS | Quality of service |
| PER | Packet error rate |
| PDB | Packet delay budget |
| E2E | End to end |
| NES | Network energy saving |
| QCI | Quality class indication |
| RSRP | Reference signal received power |
| PCI | Primary cell ID |
| CSI-RS | Channel state information reference signals |
| PTRS | Phase tracking reference signals |
| DTX | Discontinuous transmission or discontinuous transmit |
| DRX | Discontinuous reception or discontinuous receive |
| CG | Configured grant |
| ULP | Uplink power |
| FBS | Fake base station |
| NTN | Non terrestrial network |
| gRAN | Ground radio access network |
| RAN | Radio access network |

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above-described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" or variations thereof as may be used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive-in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:

facilitating, by a radio network node comprising at least one processor, receiving, from network equipment, a reduced-capability connection establishment criterion configuration, comprising at least one mode transitioning criterion;

with respect to at least one first beam corresponding to the radio network node, determining, by the radio network node, a first number of user equipment transitioning to a connected mode with respect to the radio network node to result in a determined first transitioning number;

analyzing, by the radio network node, the determined first transitioning number with respect to the at least one mode transitioning criterion to result in an analyzed determined first transitioning number;

based on the analyzed determined first transitioning number failing to satisfy the at least one mode transitioning criterion, determining, by the radio network node, reduced-capability connection establishment information to be associated with, during a discontinuous receive off period to be enabled at least in part by the radio network node, a beam group that comprises the at least one first beam and a second beam; and broadcasting, by the radio network node, a reduced-capability connection establishment information indication indicative of the reduced-capability connection establishment information usable, by at least one idle user equipment, to facilitate transmission of uplink traffic to the radio network node during the discontinuous receive off period.

2. The method of claim 1, wherein, based on first and second received signal strengths respectively corresponding to first and second downlink signals respectively received according to the at least one first beam and the second beam, the at least one idle user equipment determined, before the discontinuous receive off period, a first beam of the at least one first beam or the second beam as being an optimal downlink beam according to at least one beam selection metric.

3. The method of claim 1, further comprising:

allocating, by the radio network node, at least one uplink resource to be associated with the beam group to result in at least one allocated group uplink resource, wherein the reduced-capability connection establishment information comprises a group uplink resource indication indicative of the at least one allocated group uplink resource.

4. The method of claim 3, wherein the reduced-capability connection establishment information further comprises at least one group random access preamble usable by the at least one idle user equipment to establish a connection with the radio network node according to the at least one allocated group uplink resource.

5. The method of claim 3, wherein the reduced-capability connection establishment information further comprises a reduced-service indication indicative of at least one service that is to be facilitated by the radio network node during the discontinuous receive off period.

6. The method of claim 5, wherein the reduced-capability connection establishment information further comprises at least one group random access preamble, associated with the at least one service, usable by the at least one idle user equipment to establish a connection with the radio network node according to the at least one allocated group uplink resource, and further comprising:

receiving, by the radio network node from the at least one idle user equipment during the discontinuous receive off period, the at least one group random access preamble; and based on the receiving of the at least one group random access preamble, facilitating, by the radio network node, providing the at least one service to the at least one idle user equipment during the discontinuous receive off period.

7. The method of claim 6, wherein the at least one service is an emergency service.

8. The method of claim 7, wherein the emergency service comprises facilitation of an emergency number call.

9. The method of claim 1, further comprising:

determining, by the radio network node according to a function with respect to at least the at least one first beam and the second beam, a composite beam, wherein the reduced-capability connection establishment information comprises a composite beam direction indication indicative of a composite beam direction corresponding to the composite beam.

10. The method of claim 9, wherein the at least one first beam corresponds to a first beam direction, wherein the second beam corresponds to a second beam direction, and wherein the composite beam direction is different than the first beam direction or the second beam direction.

11. The method of claim 10, further comprising:

during the discontinuous receive off period, avoiding, by the radio network node, receiving signals transmitted according to the first beam direction and the second beam direction.

12. The method of claim 11, wherein a first reception performance of the radio network node is inferior to a second reception performance, wherein the first reception performance corresponds to the composite beam direction during a discontinuous receive off period, wherein the second reception performance corresponds to the first beam direction or the second beam direction during a discontinuous receive off disabled period during which discontinuous receive off is disabled at least in part by the radio network node, wherein at least one of the at least one user equipment determines, before the discontinuous receive off period, the at least one first beam or the second beam as being an optimal beam according to at least one beam selection metric.

13. A radio network node, comprising at least one processor configured to process executable instructions that, when executed by the at least one processor, facilitate performance of operations, comprising:

receiving, from core network equipment that is part of a core network, a reduced-capability connection establishment criterion configuration, comprising a mode transitioning criterion, with respect to at least one first downlink beam of at least one downlink beam corresponding to the radio network node, determining a first number of user equipment transitioning to a connected mode with respect to the radio network node to result in a determined first transitioning number;

analyzing the determined first transitioning number with respect to the mode transitioning criterion to result in an analyzed determined first transitioning number;

based on the analyzed determined first transitioning number failing to satisfy the mode transitioning criterion, allocating at least one uplink resource to be associated with a group of downlink beams that comprises the first at least one downlink beam, corresponding to a first beam direction, and a second downlink beam of the at least one downlink beam, corresponding to a second beam direction, to result in an at least one allocated group uplink resource; and broadcasting a reduced-capability connection establishment information indication indicative of the at least one allocated group uplink resource and group random-access information usable to transmit uplink emergency traffic to the radio network node, during a discontinuous receive off period enabled at least in part by the radio network node, by user equipment that have determined the at least one first downlink beam or the second downlink beam as being an optimal downlink beam.

14. The radio network node of claim 13, wherein the at least one allocated group uplink resource is at least one first allocated uplink resource corresponding to the first beam direction or at least one second allocated uplink resource corresponding to the second beam direction, and wherein the random-access information is first random-access information, and further comprising:

with respect to a third downlink beam of the at least one downlink beam, determining a second number of user equipment transitioning to a connected mode with respect to the radio network node to result in a determined second transitioning number;

analyzing the determined second transitioning number with respect to the mode transitioning criterion to result in an analyzed determined second transitioning number; and based on the mode transitioning criterion being satisfied by the analyzed determined second transitioning number, determining that second random access information and at least one second uplink resource indication indicative of at least one second uplink resource is to be usable to receive emergency traffic transmitted, during the discontinuous receive off period, by user equipment to the radio network node in a third direction corresponding to the third downlink beam.

15. The radio network node of claim 13, wherein the discontinuous receive off period is enabled with respect to the at least one first downlink beam and the second downlink beam.

16. The radio network node of claim 13, wherein the operations further comprise:

monitoring, during the discontinuous receive off period, the allocated at least one uplink resource with respect to a composite beam direction; and avoiding, during the discontinuous receive off period, monitoring uplink resources with respect to the first beam direction and the second beam direction.

17. The radio network node of claim 16, wherein the at least one first downlink beam and the second downlink beam are spatially adjacent to each other, and wherein the composite beam direction is spatially oriented between the first beam direction and the second beam direction.

18. A non-transitory machine-readable medium, comprising executable instructions that, when executed by at least one processor of a radio network node, facilitate performance of operations, comprising:

receiving, from a core network device, a reduced-capability connection establishment criterion configuration, comprising a mode transitioning criterion;

with respect to a first downlink beam corresponding to the radio network node, determining a first number of user equipment transitioning to a connected mode with respect to the radio network node to result in a determined first transitioning number;

analyzing the determined first transitioning number with respect to the mode transitioning criterion to result in an analyzed determined first transitioning number;

based on the analyzed determined first transitioning number failing to satisfy the mode transitioning criterion, allocating at least one group uplink resource to be associated with a group of beam pairs that comprises a first beam pair corresponding to the first downlink beam and corresponding to a first beam direction, and a second beam pair, corresponding to the radio network node and corresponding to a second beam direction, to result in an at least one allocated group uplink resource;

determining, according to a function with respect to at least the first beam pair and the second beam pair, a composite uplink beam direction;

broadcasting a reduced-capability connection establishment information indication indicative of the at least one allocated group uplink resource usable to transmit emergency uplink traffic to the radio network node, during a discontinuous receive off period to be enabled at least in part by the radio network node, by user equipment that have determined the first downlink beam or a second downlink beam of the second beam pair as being an optimal downlink beam;

enabling, at least in part, a discontinuous receive off period, at least with respect to the first downlink beam and the second downlink beam, to result in an enabled discontinuous receive off period;

receiving, via the at least one allocated group uplink resource according to the composite uplink beam direction during the enabled discontinuous receive off period from an idle user equipment that has determined a first downlink beam or a second downlink beam, corresponding to the first beam pair or the second beam pair, respectively, as being an optimal downlink beam, an uplink preamble; and based on the receiving of the uplink preamble, establishing a connection with the idle user equipment.

19. The non-transitory machine-readable medium of claim 18, wherein the reduced-capability connection establishment information indication is further indicative of an emergency preamble, wherein the uplink preamble received from the idle user equipment is the emergency preamble, and wherein the establishing of the connection with the idle user equipment comprises:

disabling, at least in part, the discontinuous receive off period, at least with respect to the first beam pair and the second beam pair, to result in a disabled discontinuous receive off period; and broadcasting a system information block signal message indicative to the idle user equipment to use at least one uplink resource corresponding to the optimal downlink beam to transmit a non-emergency preamble to the radio network node during the disabled discontinuous receive off period.

20. The non-transitory machine-readable medium of claim 19, wherein the emergency preamble corresponds to, and is indicative to the radio network node of, an emergency service.

\*    \*    \*    \*    \*